(12) United States Patent
Agarwal

(10) Patent No.: US 8,576,859 B2
(45) Date of Patent: Nov. 5, 2013

(54) ACM PACKET FETCH AND CLUSTERING

(75) Inventor: Anil Agarwal, North Potomoc, MD (US)

(73) Assignee: ViaSat, Inc., Carlsbad, CA (US)

( * ) Notice: Subject to any disclaimer, the term of this patent is extended or adjusted under 35 U.S.C. 154(b) by 442 days.

(21) Appl. No.: 12/817,297

(22) Filed: Jun. 17, 2010

(65) Prior Publication Data

US 2010/0322149 A1 Dec. 23, 2010

Related U.S. Application Data

(60) Provisional application No. 61/187,695, filed on Jun. 17, 2009.

(51) Int. Cl.
*H04B 7/185* (2006.01)
*H04L 12/28* (2006.01)

(52) U.S. Cl.
USPC ............... 370/401; 370/415; 455/427

(58) Field of Classification Search
None
See application file for complete search history.

(56) References Cited

U.S. PATENT DOCUMENTS

| | | | |
|---|---|---|---|
| 2002/0123370 A1* | 9/2002 | Berg et al. | 455/562 |
| 2007/0097852 A1 | 5/2007 | Thesling | |
| 2007/0258487 A1* | 11/2007 | Puputti | 370/474 |
| 2008/0056184 A1* | 3/2008 | Green | 370/329 |
| 2009/0040970 A1* | 2/2009 | Ahmadi et al. | 370/329 |
| 2009/0161623 A1* | 6/2009 | Klein et al. | 370/329 |
| 2009/0161789 A1* | 6/2009 | Imamura et al. | 375/295 |
| 2009/0180432 A1* | 7/2009 | Harada et al. | 370/329 |
| 2009/0232084 A1* | 9/2009 | Li et al. | 370/329 |

FOREIGN PATENT DOCUMENTS

EP 1855498 A2 11/2007

OTHER PUBLICATIONS

Digital Video Broadcasting (DVB), Generic Stream Encapsulation implementation guidelines, Technical Specification, European Telecommunications Standards Institute (ETSI), 650, Route Des Lucioles, F-06921 Sophia-Antipolis, France, No. V1.1.1, Jun. 1, 2009; XP014044490.
Digital Video Broadcasting (DVB), Second generation framing structure, channel coding and modulation systems for Broadcasting, Interactive Services, News Gathering and other broadband satellite applications European Broadcasting Union Union Européenne de Radio-Télévision Ebuüer, ETSI EN 302 307, ETSI Standards, Lis, Sophia-Antipolis Cedex, France, vol. BC, No. V1.1.2, Jun. 1, 2006, XP014034070, ISSN 0000-0001.

* cited by examiner

*Primary Examiner* — Gregory Sefcheck
*Assistant Examiner* — Joshua Smith
(74) *Attorney, Agent, or Firm* — Holland & Hart LLP

(57) ABSTRACT

Systems, methods, devices, and processors are described for packet clustering and frame formation in ACM systems. A stream of packets may be received at a gateway. During each cycle, a group of packets from the stream may be fetched according to QoS parameters. The group of packets may be clustered according to modcode to produce a packet list. In some embodiments, packets may be arranged and grouped according to transport steam identifier and modcode to produce a packet list. The packet lists may be clustered sequentially from lower order modcode to higher order modcode. Various frame packing techniques are also described.

49 Claims, 21 Drawing Sheets

505 510

| Modcode | Signal Quality Range (SNR) |
|---|---|
| QPSK 1/4 | Range 1 |
| QPSK 1/3 | Range 2 |
| QPSK 2/5 | Range 3 |
| QPSK 1/2 | Range 4 |
| QPSK 3/5 | Range 5 |
| QPSK 2/3 | Range 6 |
| QPSK 3/4 | Range 7 |
| QPSK 4/5 | Range 8 |
| QPSK 5/6 | Range 9 |
| QPSK 8/9 | Range 10 |
| QPSK 9/10 | Range 11 |
| 8PSK 3/5 | Range 12 |
| 8PSK 2/3 | Range 13 |
| 8PSK 3/4 | Range 14 |
| 8PSK 5/6 | Range 15 |
| 8PSK 8/9 | Range 16 |
| 8PSK 9/10 | Range 17 |
| 16APSK 2/3 | Range 18 |
| 16APSK 3/4 | Range 19 |
| 16APSK 4/5 | Range 20 |
| 16APSK 5/6 | Range 21 |
| 16APSK 8/9 | Range 22 |
| 16APSK 9/10 | Range 23 |
| 32APSK 3/4 | Range 24 |
| 32APSK 4/5 | Range 25 |
| 32APSK 5/6 | Range 26 |
| 32APSK 8/9 | Range 27 |
| 32APSK 9/10 | Range 28 |

| Addr | SNR |
|---|---|
| Addr 1 | A |
| Addr 2 | B |
| Addr 3 | C |
| Addr 4 | D |
| Addr 5 | E |
| Addr 6 | F |
| Addr 7 | G |
| ⋮ | ⋮ |
| Addr *n* | N |

ACM PACKET FETCH AND CLUSTERING

CROSS-REFERENCES

This application claims priority from U.S. Provisional Patent Application No. 61/187,695, filed Jun. 17, 2009, entitled "ACM PACKET CLUSTERING AND FRAME FORMATION" which is hereby incorporated by reference, as if set forth in full in this document, for all purposes.

BACKGROUND

The present invention relates to wireless communications in general and, in particular, to certain packet clustering and frame formation techniques in an adaptive coding and modulation (ACM) system. Using ACM, the modulation format and Forward Error Correction ("FEC") codes for a signal may be adapted to better match the link conditions for each user in a multi-user system. A return channel or other means may be used to report the conditions of a receiving terminal. In a broadcast system, for example, the waveform broadcast to a number of users includes data packets designated only for an individual terminal (or small group of terminals). A message transmitted to a user requires fewer symbols (and thus less time) when a higher order modulation and higher code rate are used. Lower order modulation and lower code rate are more reliable but require more time to transmit the same amount of data. Using ACM, each packet may be transmitted at an optimized modulation and coding format ("modcode") level given the destination terminal's link conditions.

In optimizing modcode levels for a destination terminal's link conditions, first-in first-out (FIFO) queueing is used in some traditional systems. However, different sets of packets may have different modcodes and have varying quality of service requirements. In some implementations, there can be many packets in a single frame being transmitted according to a given modcode. Using certain traditional methods may be inefficient, however, because the frame formation may result in additional padding or header overhead, or cause delay. It may, therefore, be desirable for there to be novel techniques for forming frames to be transmitted.

SUMMARY

Systems, methods, devices, and processors are described for packet clustering and frame formation in ACM systems. A stream of packets may be received at a gateway for distribution to terminals in a satellite communications system. A QoS scheduler may be used to filter and forward packets according to QoS parameters. A cycle may be set wherein a group of packets from the stream may be fetched. The size of the group of packets is approximately equal to the packets that can be transmitted during the cycle. A modcode then may be assigned to each of the packets of the group. The group of packets may be clustered according to modcode to create a packet list, wherein packets are listed sequentially from lower order modcode to higher order modcode. The group of packets may be encapsulated in frames for transmission according to the order of the packet list, and another group may be fetched for the next cycle.

In some embodiments, a set of packets is fetched (e.g., the group of packets described above), and clustered according to modcode. Within each modcode cluster, the packets may be grouped according to a transport stream identifier (e.g., a Packet ID, or "PID") to produce a packet list. The packet list may be ordered sequentially from lower order modcode to higher order modcode. The packets may be sequentially fetched from the list for encapsulation (e.g., in Moving Pictures Expert Group-2 ("MPEG-2") packets). Encapsulated packets having the same modcodes are encapsulated in one or more baseband frames.

Various frame packing techniques are described. When a baseband frame is being filled and there is a transition between modcodes, the current baseband frame may not be completely filled. In one embodiment, if a baseband frame is left non-full, it will be padded and a new baseband frame will be started for the new modcode. There is no searching or back-tracking In another embodiment, if a baseband frame is left non-full, the packet list may be ordered so that the next packets are assigned higher order modcodes, and they may be used to fill the frame. There is no searching or back-tracking In still other embodiments, if a baseband frame is left non-full, it may be held to a next cycle, and filled at that time.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5A is a block diagram illustrating a modcode table according to various embodiments of the invention.

FIG. 5B is a block diagram illustrating an address/SNR table according to various embodiments of the invention.

DETAILED DESCRIPTION OF THE INVENTION

Systems, methods, devices, and processors are described for packet clustering and frame formation in ACM systems. A stream of packets may be received at a gateway. During each cycle, a group of packets from the stream may be fetched according to QoS parameters. The group of packets may be clustered according to modcode to produce a packet list. In some embodiments, packets may be arranged and grouped according to transport stream identifier and modcode to produce a packet list. The packet lists may be clustered sequentially from lower order modcode to higher order modcode. Various frame packing techniques are also described.

This description provides examples only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
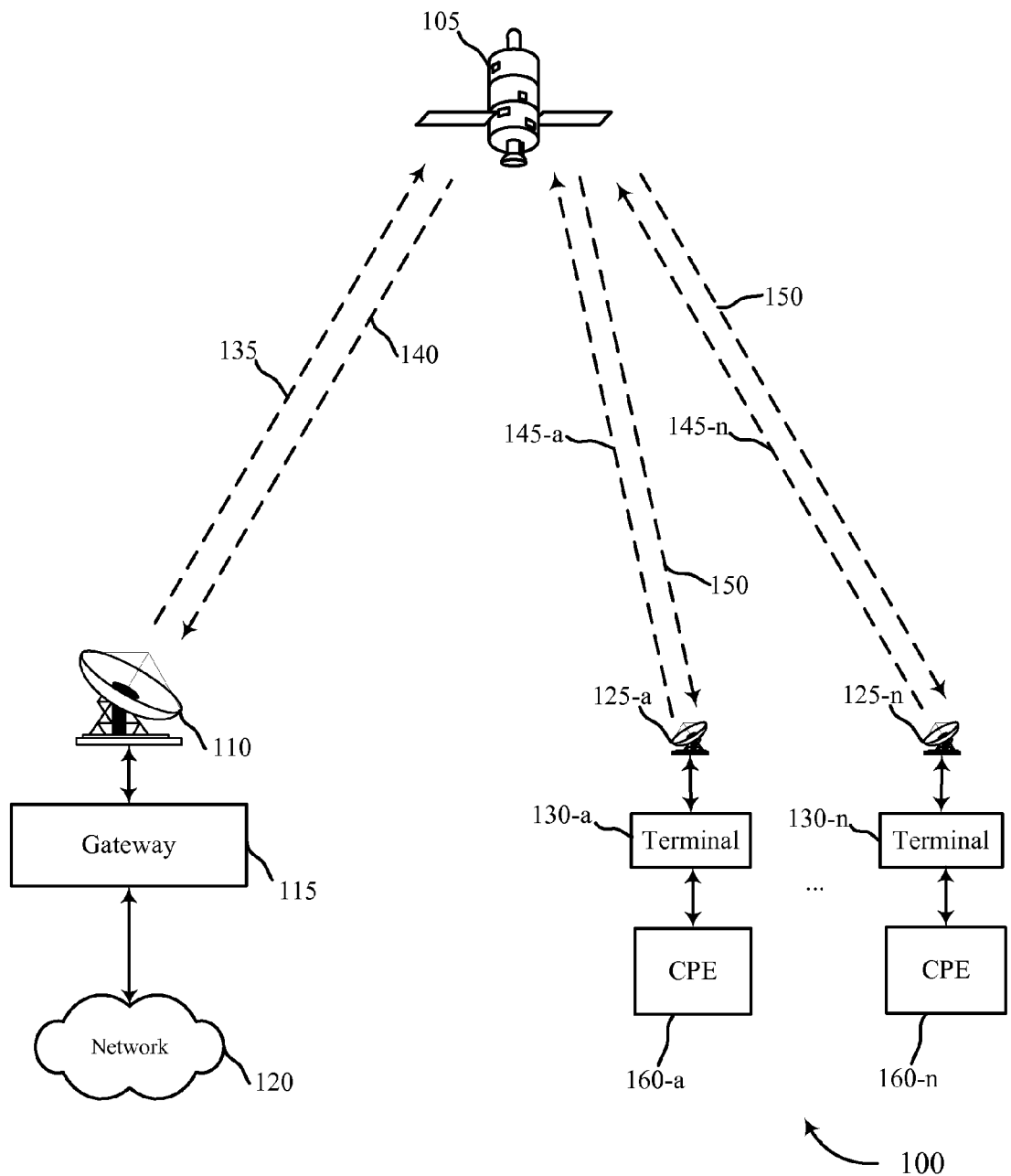
FIG. 1 is a block diagram illustrating an example satellite communications system according to various embodiments of the invention.

Referring first to FIG. 1, a block diagram illustrates an example satellite communications system 100 configured according to various embodiments of the invention. While a satellite communications system is used to illustrate various aspects of the invention, it is worth noting that certain principles set forth herein are applicable to a number of other wireless systems, as well. The satellite communications system 100 includes a network 120, such as the Internet, interfaced with a gateway 115 that is configured to communicate with one or more terminals 130, via a satellite 105.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. Many other examples are possible and apparent to those skilled in the art in light of this disclosure. The network 120 may connect the gateway 115 with other gateways (not pictured), which are also in communication with the satellite 105, and which may share information on link conditions and other network metrics.

The gateway 115 provides an interface between the network 120 and the terminal 130. The gateway 115 may be configured to receive data and information directed to one or more terminals 130, and format the data and information (e.g., using ACM) for delivery downstream to the respective terminals 130 via the satellite 105. Similarly, the gateway 115 may be configured to receive upstream signals from the satellite 105 (e.g., from one or more terminals 130) directed to a destination in the network 120, and can format the received signals for transmission through the network 120.

A device (not shown) connected to the network 120 may, therefore, communicate with one or more terminals 130 through the gateway 115, via the satellite 105. Data and information, for example IP datagrams, may be sent from a device in the network 120 to the gateway 115. The gateway 115 may format a Medium Access Control (MAC) frame in accordance with a physical layer definition for transmission to the satellite 105 via a downstream link 135. A variety of physical layer transmission modulation and coding techniques may be used with certain embodiments of the invention, including those defined with the Digital Video Broadcast-Second Generation (DVB-S2) and Worldwide Interoperability for Microwave Access (WiMAX) standards. In a number of embodiments, the gateway 115 utilizes ACM in conjunction with one or more of the traffic control and shaping techniques described herein to direct traffic to the individual terminals. The gateway 115 may use a broadcast signal, with a modulation and coding (modcode) format adapted for each packet to the link conditions of the terminal 130 or set of terminals 130 to which the packet is directed (e.g., to account for the variable service link 150 conditions from the satellite 105 to each respective terminal 130).

The gateway 115 may use an antenna 110 to transmit the signal to the satellite 105. In one embodiment, the antenna 110 is a parabolic reflector with high directivity in the direction of the satellite and low directivity in other directions. The downstream signals 135, 150 may include, for example, one (or more) single carrier signals. Each single carrier signal may be divided in time (e.g., using TDMA or other time-division multiplexing techniques) into a number of sub-channels. The sub-channels may be the same size, or different sizes, and a range of options will be addressed below. In some embodiments, other channelization schemes may be integrated with or used in place of time-divided sub-channels, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of the antenna 110 and within the frequency band and specific polarization transmitted. The satellite 105 may, for example, use a reflector antenna, lens antenna, array antenna, active antenna, or other mechanism known in the art for reception and/or transmission of signals. The satellite 105 may process the signals received from the gateway 115 and transmit the signal from the gateway 115 to one or more terminals 130. In one embodiment, the satellite 105 operates in a multi-beam mode, transmitting a number of narrow beams, each directed at a different region of the earth, allowing for frequency re-use. With such a multibeam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments, a number of configurations are possible (e.g., using LEO satellites, or using a mesh network instead of a star network), as evident to those skilled in the art.

The service signals transmitted from the satellite 105 may be received by one or more terminals 130, via the respective antenna 125. In one embodiment, the antenna 125 and terminal 130 together make up a very small aperture terminal (VSAT). In other embodiments, a variety of other types of antennas 125 may be used at the terminal 130 to receive the signal from the satellite 105. Each of the terminals 130 may be a single user terminal or, alternatively, be a hub or router (not pictured) that is coupled with multiple user terminals. Each terminal 130 may be connected to consumer premises equipment (CPE) 160 (e.g., computers, local area networks, Internet appliances, wireless networks, etc.).

In one embodiment, a Multi-Frequency Time-Division Multiple Access (MF-TDMA) scheme is used for upstream links 140, 145, allowing efficient streaming of traffic while maintaining flexibility in allocating capacity among each of the terminals 130. In this embodiment, a number of frequency channels are allocated which may be fixed, or which may be allocated in a more dynamic fashion. A Time Division Multiple Access (TDMA) scheme is then employed in each frequency channel. In this scheme, each frequency channel may be divided into several timeslots that can be assigned to a connection (i.e., a terminal 130). In other embodiments, one or more of the upstream links 140, 145 may be configured with other schemes, such as TDMA, FDMA, OFDMA, CDMA, or any number of hybrid or other schemes known in the art.

A terminal 130 may transmit information related to signal quality to the gateway 115 via the satellite 105. The signal quality may be a measured signal-to-noise ratio, an estimated signal-to-noise ratio, a bit error rate, a received power level, or any other communication link quality indicator. The terminal 130 itself may measure or estimate the signal quality, or it may pass information measured or estimated by other devices. The terminal 130 may specify a modcode to be used for transmission by the gateway 115 to the terminal 130, or to the set of terminals near the terminal 130. A terminal 130 may also transmit data and information to a network 120 destination via the satellite 105 and gateway 115. The terminal 130 transmits the signals via the upstream uplink 145 to the satellite 105 using the antenna 125. A terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The gateway 115 may, in some embodiments, use this signal quality information to implement ACM, adjusting the modcode formats to each terminal or set of terminals based on their link conditions.

Figure 2:
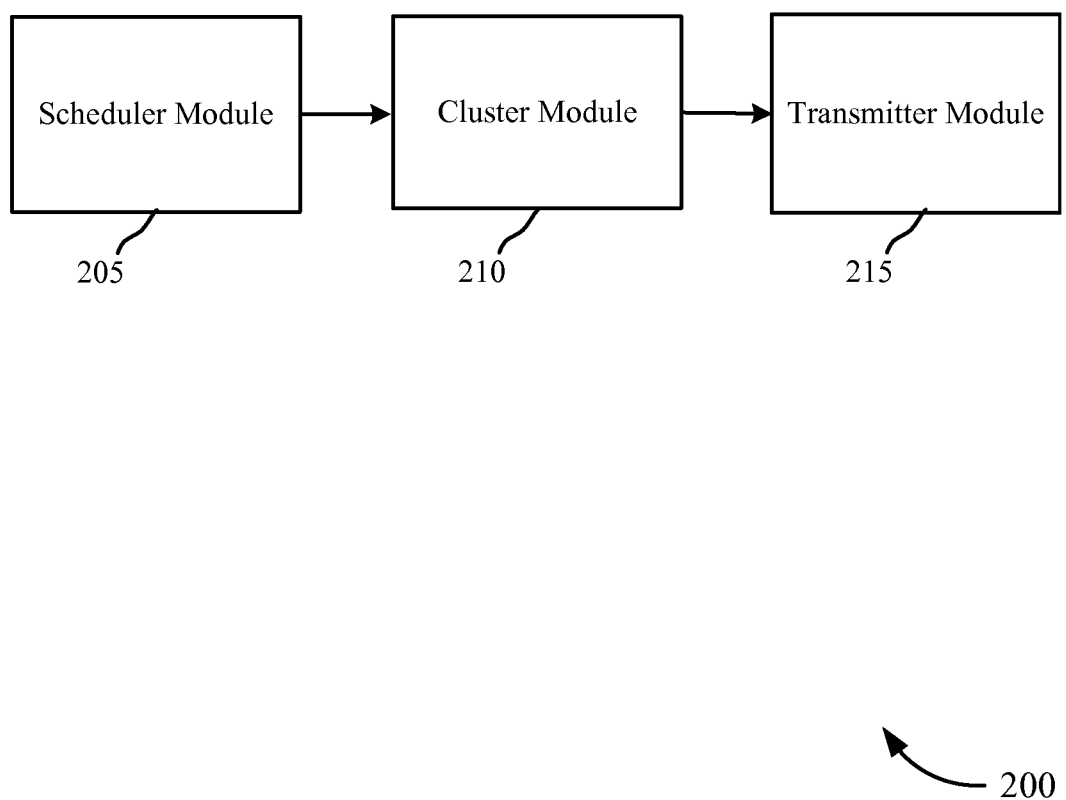
FIG. 2 is a simplified block diagram illustrating an example configuration according to various embodiments of the invention.

Per-cycle Packet Fetch and Modcode Clustering in an ACM System: Turning to FIG. 2, a block diagram is shown illustrating an example configuration 200 for per-cycle clustering in a satellite communications network. This configuration 200 may be implemented in the system 100 of FIG. 1 or, more specifically, may be implemented in the gateway 115, the satellite 105, the terminal 130, or any combination thereof. However, some or all of the functionality of this configuration may be implemented in other devices or sets of devices.

The configuration 200 includes a scheduler module 205, a cluster module 210, and a transmitter module 215, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The scheduler module 205 may receive a stream of packets (e.g., from network 120 of FIG. 1) for transmission to terminals (e.g., terminals 130 of FIG. 1). The cluster module 210 may identify a cycle period, and fetch a group of packets from the received stream of packets. The fetched group may be approximately equal in size to an estimated number of packets that can be transmitted within the cycle period. The cluster module 210 may associate a modcode with each of the packets of the first fetched group, each modcode adapted to the link quality of a destination terminal. The cluster module 210 may, therefore, receive link quality information from terminals (or other sources). The modcodes may be determined after respective packets are fetched. The cluster module 210 may cluster the fetched group according to modcode in sequential order from lower order modcode to higher order modcode.

The transmitter module 215 transmits all or part of the group in frames in the sequential order. In one embodiment, the transmitter module 215 transmits only a subset of the group of packets during the first cycle period. The cluster module 210 may identify those packets remaining to be transmitted after the cycle period, and change a fetch size for the next group of packets in response to the identification. The next group of packets may then be fetched by the cluster module 210 from the scheduler module 205.

Figure 3:
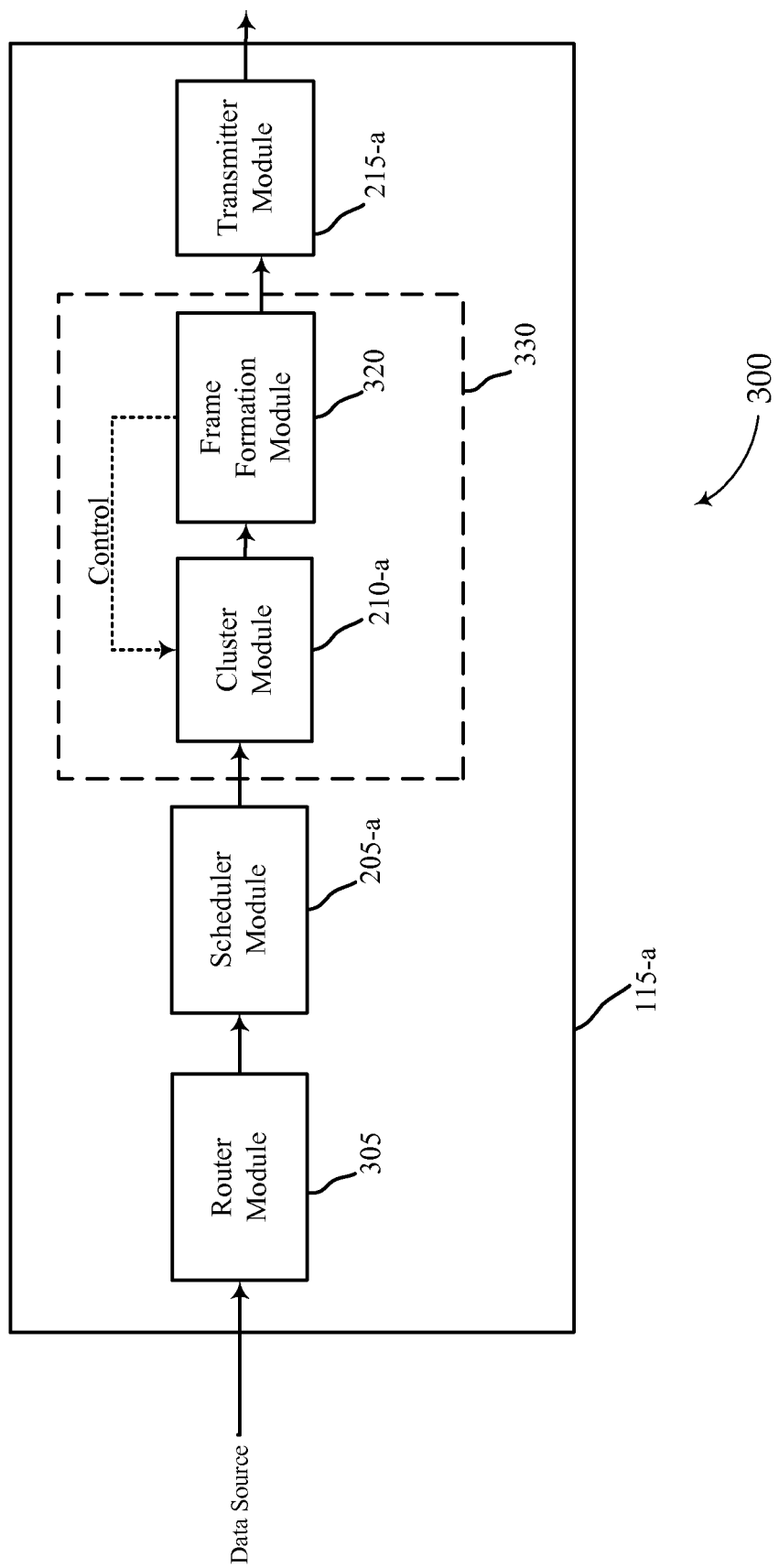
FIG. 3 is a simplified block diagram illustrating an example gateway configuration according to various embodiments of the invention.

Referring next to FIG. 3, a simplified block diagram 300 illustrates an example configuration of a device 115-a according to various embodiments of the invention. The device 115-a may be the gateway 115 of FIG. 1, transmitting packets downstream with modcodes adapted to the link to which the packets are directed. In other embodiments, the device 115-a may be used in any number of different ACM implementations. The device 115-a may be an implementation of the configuration of 200 of FIG. 2.

The device 115-a in this embodiment includes a router module 305, a scheduler module 205-a, a cluster module 210-a, a frame formation module 320, and a transmitter module 215-a. In some embodiments, the cluster module 210-a and the frame formation module 320 together form an encapsulation module 330. These components (205-330) may be implemented, in whole or in part, in hardware. Thus, they may comprise one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. Each may also be implemented, in whole or in part, with instructions embodied in a computer-readable medium, formatted to be executed by one or more general or application specific processors. Thus, the device 115-a may include different types and configurations of memory (not shown), which may be integrated into the hardware or may be one or more separate components.

For purposes of discussion, assume that the device 115-a is a gateway 115 within the system 100 of FIG. 1. In one embodiment, the system 100 is implemented in a star configuration where each terminal 130 communicates with the device 115-a, receiving a wide band broadcast signal and searching the waveform for data destined for that terminal 130. Each terminal 130 estimates the SNR of the received signal, although in other embodiments, different signal quality metrics may be used. This information is included in the return path, which may be established via a satellite link or some other means. In other embodiments, the device 115-a may receive the link signal quality data from other sources as well. The device 115-a may then have an SNR estimate for each terminal, and may organize this data on one or more memories, which may be implemented in hardware, in a separate computer readable medium, or external to the device 115-a.

Turning now to the packet flow, a data packet may be received from the network 120, and travel through the router module 305 to determine the outbound interface for the received packet. The scheduler module 205-a may then buffer the received packets. The scheduler module 205-a may filter the outgoing packets using any number of QoS queueing schemes (e.g., weighted fair queueing (WFQ), random early detection (RED), strict priority scheduling (SPS), or first-in first-out (FIFO) techniques). In some embodiments, various traffic classes may be associated with the received packets, and any number of prioritization schemes may be used. Weighting functions may be used to give different classes a greater proportion of the available bandwidth or expedited queuing. Certain receiving terminals 130 may also receive some measure of preference.

The cluster module 210-a may, during each cycle time (e.g., T=5 ms), fetch a group of ~T ms worth of data packets. In one embodiment, the cluster module 210-a pulls a group of ~T ms packets, updating the size of the group after determining the modcode assignment for each (or a subset) of pulled packets. In this way, the group size may be very close to ~T ms packets. In other embodiments, this may be only an estimate, as the modcode may not have been set when the group of packets is fetched (as the cluster module 210-a determines the modcode for packets only after they are fetched in some embodiments). Initially, the group may be slightly greater than T to allow for more options with the packing efficiency. Over time, however, the group fetched each cycle will approximate the traffic transmitted for the cycle time. Some cycles may be more, or less, efficient with packing, and the amount of data forwarded in the data packets may vary accordingly. The cycle time may be changed depending on traffic conditions—a longer cycle time may result in more efficient packing, but cause increased delay and complexity. Thus, a cycle time may be modified dynamically when traffic characteristics or traffic load at the device 115-a changes. In one embodiment, characteristics of the received stream of packets are monitored, and the cycle period is modified responsive to the monitored characteristics.

The approximately T ms worth of packets fetched for a cycle may be dispatched in baseband frames. There are a number of frame formation alternatives, which will be discussed in more detail below. The cluster module 210-a may dynamically assign a modcode to each packet of the group to be transmitted during the cycle (e.g., after each respective packet, or the group of packets, is fetched). The cluster module 210-a may be configured to use the destination address, in conjunction with the SNR estimate, to identify a modcode to use to communicate with a terminal 130. To do so, the cluster module 210-a may produce or otherwise access a modcode table (e.g., modcode table 500 of FIG. 5A, to be discussed below), or other mechanism which correlates certain SNR estimate ranges with different modcodes.

The cluster module 210-a may reorganize packets into clusters according to modcode. In one embodiment, each modcode cluster may then be reorganized according to a traffic stream identifier (e.g., a PID), and then be encapsulated (e.g., in MPEG-2 packets). The group of packets (which may include any packets remaining from the previous cycle) are then processed by the frame formation module 320. The frame formation module 320 may encapsulate each cluster in one or more baseband frames, with the order proceeding from lower order modcodes to higher order modcodes. Note that an example encapsulation with MPEG-2 packets and baseband frame formation will be discussed in more detail below (e.g., with reference to FIG. 6). The baseband frames for the cycle may then be forwarded to the transmitter module 215-a, and any excess symbols (unused symbols in the baseband frames that were forwarded for transmission) or packets remaining to be transmitted may be calculated. A new group may then be fetched from the scheduler module 205-a for the next cycle. The excess symbols/packets remaining from the previous group may be taken into account in sizing the new group. Any packets remaining from previous cycles may be given precedence in the next cycle. The transmitter module 215-a may be configured to transmit the sorted packets according to the modcode specified for the baseband frame.

It is worth noting that in some embodiments, the frame formation module 320 may determine that space remains available in a frame (e.g., a baseband frame) because there are insufficient packets associated with a given modcode in a given group to fill the frame. In such circumstances, the frame formation module 320 may utilize packets from a second modcode of higher order than the first modcode to fill the frame.

Figure 4:
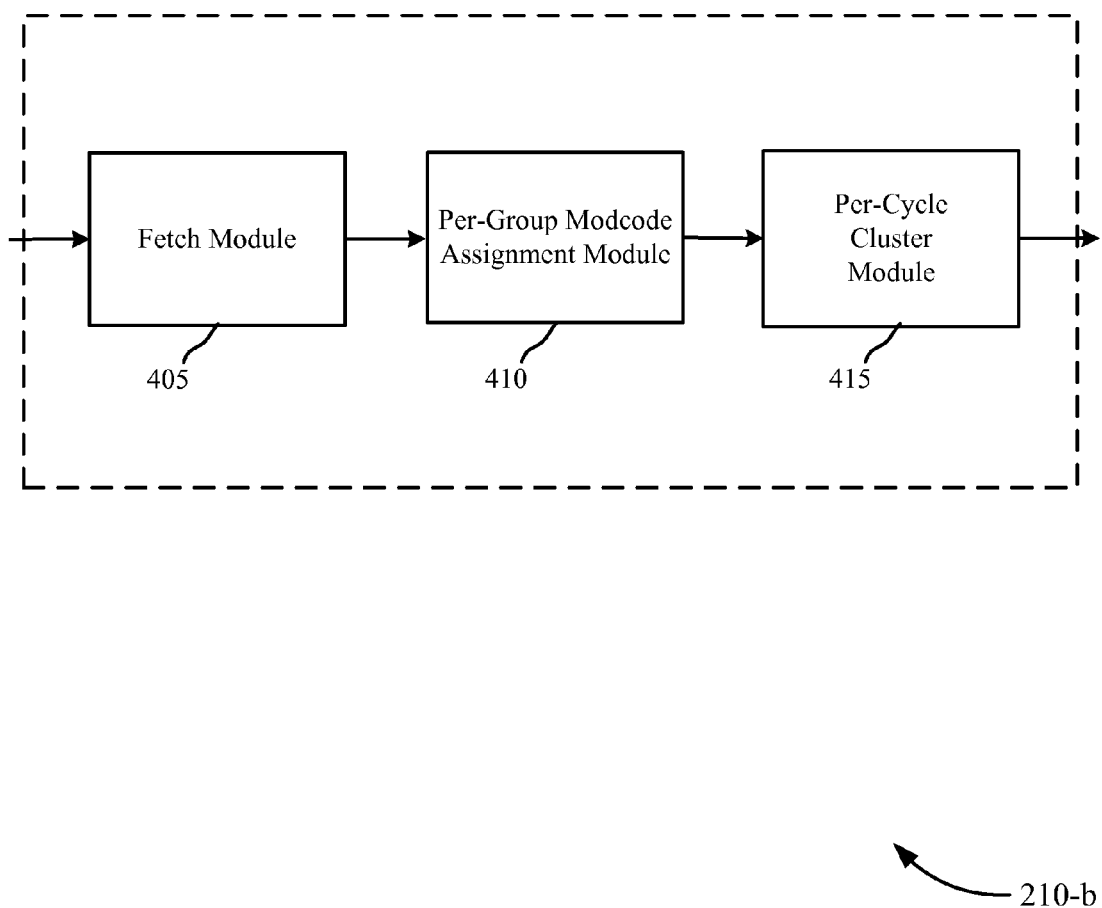
FIG. 4 is a simplified block diagram illustrating an example cluster module according to various embodiments of the invention.

Referring next to FIG. 4, a simplified block diagram illustrates an example configuration of a cluster module 210-b according to various embodiments of the invention. The cluster module 210-b may be the cluster module 210 described with reference to FIG. 2 or 3, although the functionality therein may be implemented in any number of other devices.

The cluster module 210-b in this embodiment includes a fetch module 405, a per-group modcode assignment module 410, and a per-cycle cluster module 415, which may each be in communication with each other. The fetch module 405 may identify the length of a cycle period, and estimate a fetch size for a first group in response to control information received from a previous cycle period. The fetch module 405 may then fetch packets from the received stream of packets, to create a group (newly fetched packets and packets remaining from the previous cycle period) that is approximately equal in size to an estimated number of packets that can be transmitted within the cycle period.

The per-group modcode assignment module 410 may associate a modcode with each of the packets of the first fetched group, each modcode adapted to the link quality of a destination terminal. The per-group modcode assignment module 410 may, therefore, receive link quality information from terminals (or other sources). The per-group modcode assignment module 410 may determine the modcode for each packet after respective packets, or after the group of packets, are fetched. The per-cycle cluster module 415 may cluster the fetched group according to modcode in sequential order from lower order modcode to higher order modcode, to create a packet list. The packet list may then be forwarded to a frame formation module (e.g., frame formation module 320 of FIG. 3), and then to a transmitter module (e.g., transmitter module 215 of FIG. 2 or 3) which transmits all or part of the group in frames in the sequential order.

The fetch module 405 may estimate a fetch size for a next group in response to control information received from a previous cycle period (e.g., from a frame formation module). This control information may simply identify the amount the previous fetch over- or under-estimated the fetch (e.g., identifying the number of packets remaining to be transmitted). Based on this information, the fetch module 405 may modify the fetch size, and fetch the packets for the next cycle. The per-group modcode assignment module 410 and per-cycle cluster module 415 may then process the next group of packets. The per-cycle processing may continue therefrom.

Referring to FIG. 5A, an example of a modcode table 500 is illustrated in the form of a block diagram. This form of modcode table 500 may, for example, be used by a gateway 115 of FIG. 1 or 3 (perhaps in conjunction with the cluster module 210 of FIG. 2, 3, or 4) to determine the modcode to be used for packets destined for a terminal operating in a given signal quality range. The table contains a column listing a number of modcodes 505. Each modcode 505 corresponds to a specified signal quality range 510. Thus, using the signal quality attributed to a destination link for a packet, a signal quality range 510 encompassing the link may be identified, and the appropriate modcode may be selected. For example, if a destination link has a signal quality within Range 7, the modcode QPSK 3/4 may be used. In some embodiments, one or more of the ranges may include a reliability margin (which may be beneficial when channel conditions are changing rapidly, for example). One or more of the ranges may be modified dynamically to adjust this reliability margin as well.

In other embodiments, other signal quality indicators may be used, such as a measured SNR, an estimated SNR, a bit error rate, a received power level, or any other communication link quality indicator. It is also worth noting that a number of other data structures may also be used to relate signal quality ranges to modcodes. In one embodiment, each signal quality is associated with a different packet forwarding queue. In still other embodiments, other information density parameters in addition to modcode changes may be added to further adapt a signal to environmental or other conditions.

Turning to FIG. 5B, an example of an address/SNR table 550 is illustrated in the form of a block diagram. This form of address/SNR table 550 may, for example, be used by a gateway 115 of FIG. 1 or 3 (perhaps in conjunction with the cluster module 210 of FIG. 2, 3, or 4) to look up the signal quality 560 of a terminal 130 to which a packet is destined, based on the destination address 555. The tables in FIGS. 3A and 3B may be embodied on one or more memories, which may be either on or off chip, and may be used in conjunction with one another to correlate an address with a particular modcode format.

An address may, for example, be a destination MAC address, destination VLAN-ID, a Destination Internet Protocol ("DIP") address, a private addressing ID, or any other set of data comprising or otherwise correlated with a destination address. The data address may be parsed from a received data packet after arrival at a device, or it may be received in any other manner known in the art. It is also worth noting that a number of other data structures may also be used to relate an address to signal quality.

Once a modcode for a particular packet or packets is identified, for example using the modcode table 500, it may then be encapsulated, coded, mapped, and transmitted in a variety of ways, as will be discussed in more detail below. One way to implement ACM is via the DVB-S2 standard, which specifically provides for its use. As noted above, ACM may change the modulation format and Forward Error Correction (FEC) codes ("modcodes") to best match the current link conditions. This adaptation may occur on a frame-by-frame basis. The discussion that follows assumes an IP-based packet network in the context of a DVB-S2 satellite transmission system, but the concepts may be applied for a variety of systems, including systems implementing Data Over Cable Service Interface Specification (DOCSIS) or WiMax.

Figure 6:
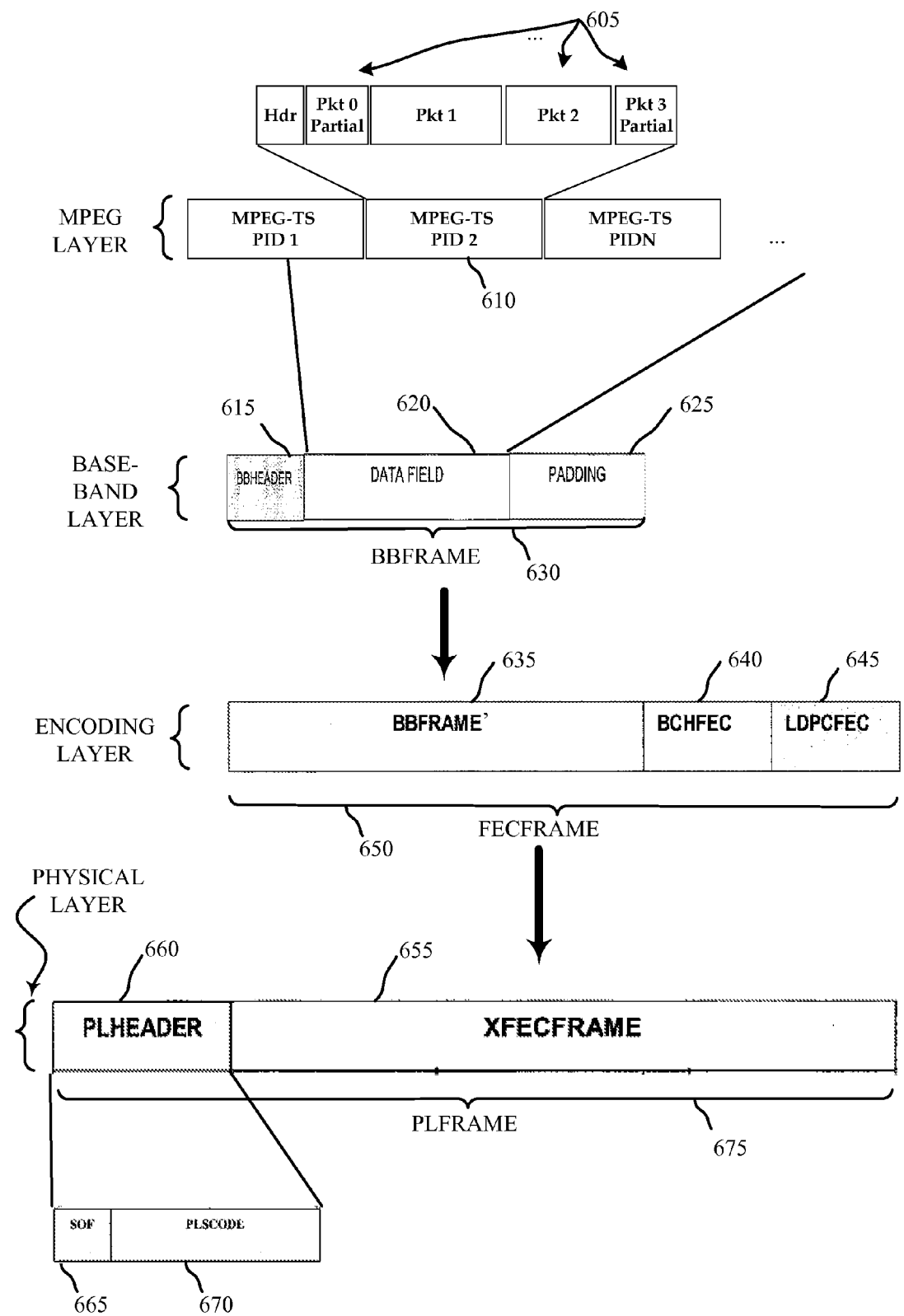
FIG. 6 is a block diagram illustrating a frame format of a DVB-S2 system according to various embodiments of the invention.

Turning to FIG. 6, the framing format 600 for a frame of a DVB-S2 system is set forth to illustrate various aspects of the invention. In one embodiment, each frame is broadcast from the gateway 115 of FIG. 1 to a number of terminals 130, but includes one or more packets directed at a select terminal 130 (or small groups of terminals 130). For example, the waveform may be a single carrier waveform transmitted downstream from a gateway 115 to a terminal 130 in the system 100 of FIG. 1. As noted above, while the DVB-S2 system is used as an example, the principles specified herein are applicable to a range of systems.

In this embodiment, the framing format that will be discussed is for purposes of example only, noting that a range of other formats may be used. An MPEG-2 packet 610 is shown, which includes a number of full or partial data packets 605 encapsulated therein. These data packets may be the data packets clustered by the frame formation module 320 of FIG. 3. Each MPEG-2 packet 610 in this embodiment contains data packets of the same PID (an MPEG-2 transport stream is identified by a 13-bit packet ID (PID)); data packets with different PIDs are placed in different MPEG-2 packets. MPEG-2 packets with the same modcode may be split across baseband frames; an MPEG-2 packet may, in some embodiments, be transmitted in a baseband frame with a lower order modcode. As will be illustrated below, each baseband frame is assigned a modcode.

A baseband frame 630 is made up of a baseband header 615, a data field 620, and padding 625. Data in the data field may include one or more full or partial MPEG-2 packets 610, or may include other types of data as well. The data field may include addressing information (e.g., IP address, MAC address, etc.) indicating the terminal or terminals to which the packet will be directed. In some embodiments, IP packets associated with different modcodes may be transmitted in the same baseband frame 630, according to the lower order modcode. The DVB-S2 specification provides that certain frames will be of fixed size regardless of the modcode used (i.e., a normal FEC frame is 64,800 bits, and a shortened FEC frame is 16,200 bits). Therefore, instead of simply padding a frame when there is additional space available and no other remaining packets associated with a current modcode, an MPEG-2 packet (or fragment thereof), or other data packet, associated with a higher order modcode may be inserted into the baseband frame 630.

Interleaving and FEC encoding (e.g., BCH and LDCP) may then be performed on the baseband frame 630 to produce an encoded baseband frame 635, with outer coding parity bits 640 and inner coding parity bits 645 appended, to produce an FEC frame 650. While, as noted above, the DVB-S2 specification provides that the FEC frame 650 will be of fixed size, in other embodiments, the FEC frame 650 size may vary according to the modcode selected for the frame, to thereby produce, for example, frames of uniform duration in time.

The FEC frame 650 is bit mapped to the applicable constellation (e.g., QPSK, 8PSK, 16APSK, 32APSK), to produce a XFEC frame 655 made up of symbols representative of the frame contents. A PL header 660 is added to the XFEC frame 655, together forming the PL frame 675. The PL header 660 is made up of a start of frame (SOF) slot 665 of 26 symbols, and a modcode (PLSCODE) slot 670 of 64 symbols specifying the modcode and size (i.e., whether normal or shortened FEC frame). The PL header 660 is encoded. The PL frame 675 is then baseband shaped and quadrature modulated, as well as amplified and upconverted to be transmitted downstream.

Figure 7:
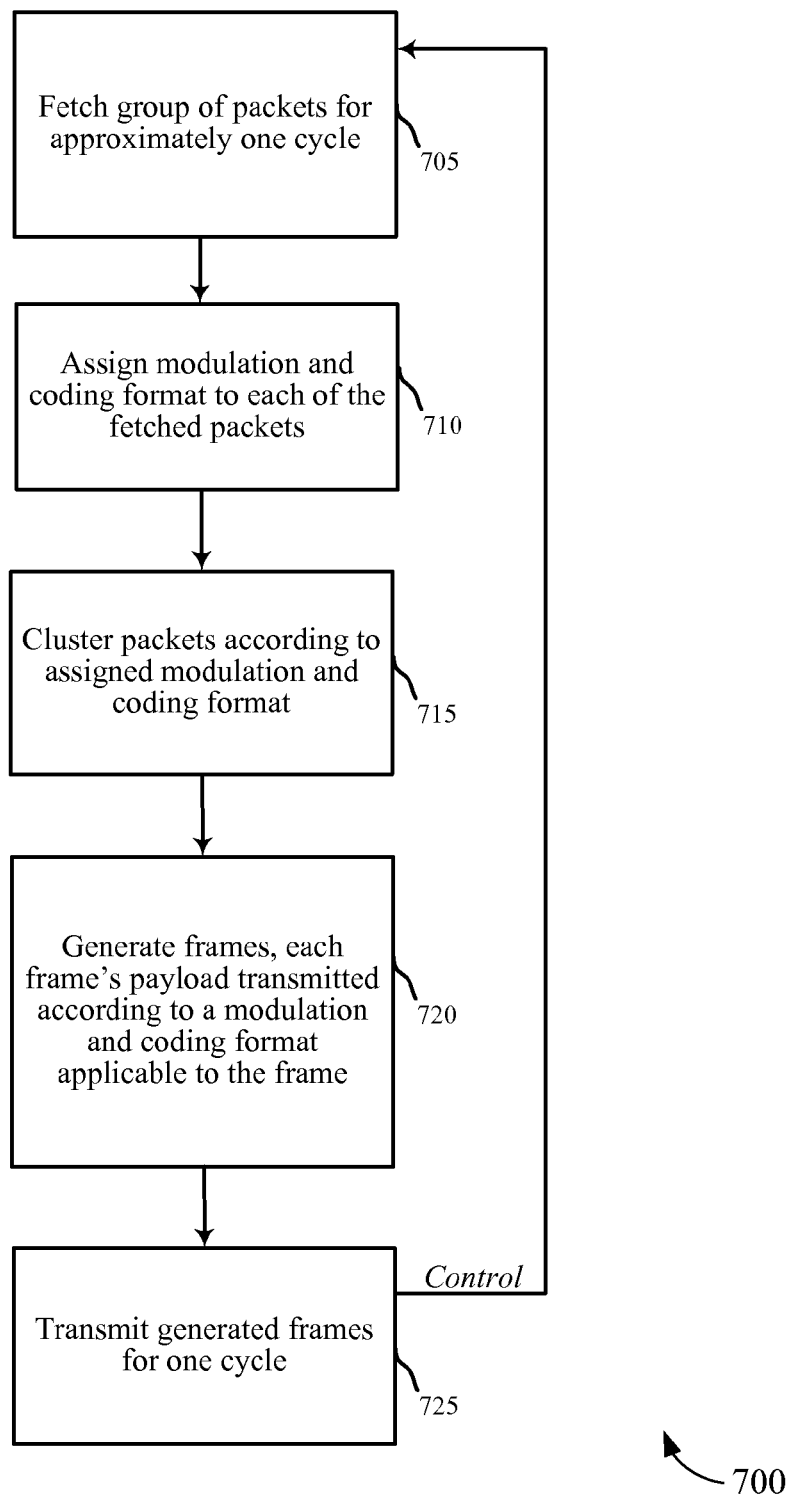
FIG. 7 is a flowchart illustrating a method of packet clustering by modcode on a per-cycle basis according to various embodiments of the invention.

FIG. 7 is a flowchart illustrating a method 700 of packet clustering by modcode on a per-cycle basis according to various embodiments of the invention. The method 700 may, for example, be performed in whole or in part by the gateway 115 of FIG. 1 or 3 or the configuration 200 of FIG. 2. More specifically, the method 700 may be performed by the cluster module 210 of FIG. 2, 3, or 4.

At block 705, a group of packets is fetched for approximately one cycle according to QoS scheduling. At block 710, a modcode is assigned to each of the fetched packets. At block 715, fetched packets are clustered according to the assigned modcode. At block 720, frames are generated with a payload of fetched packets, each frame's payload to be transmitted according to a modcode applicable to the frame. At block 725, generated frames of one cycle are transmitted, and the process returns to block 705 to fetch the packets of the group for the next cycle. Control information may be fed back to ensure that the fetch size is approximately equal in size to the number of packets that can be transmitted in one cycle.

Figure 8:
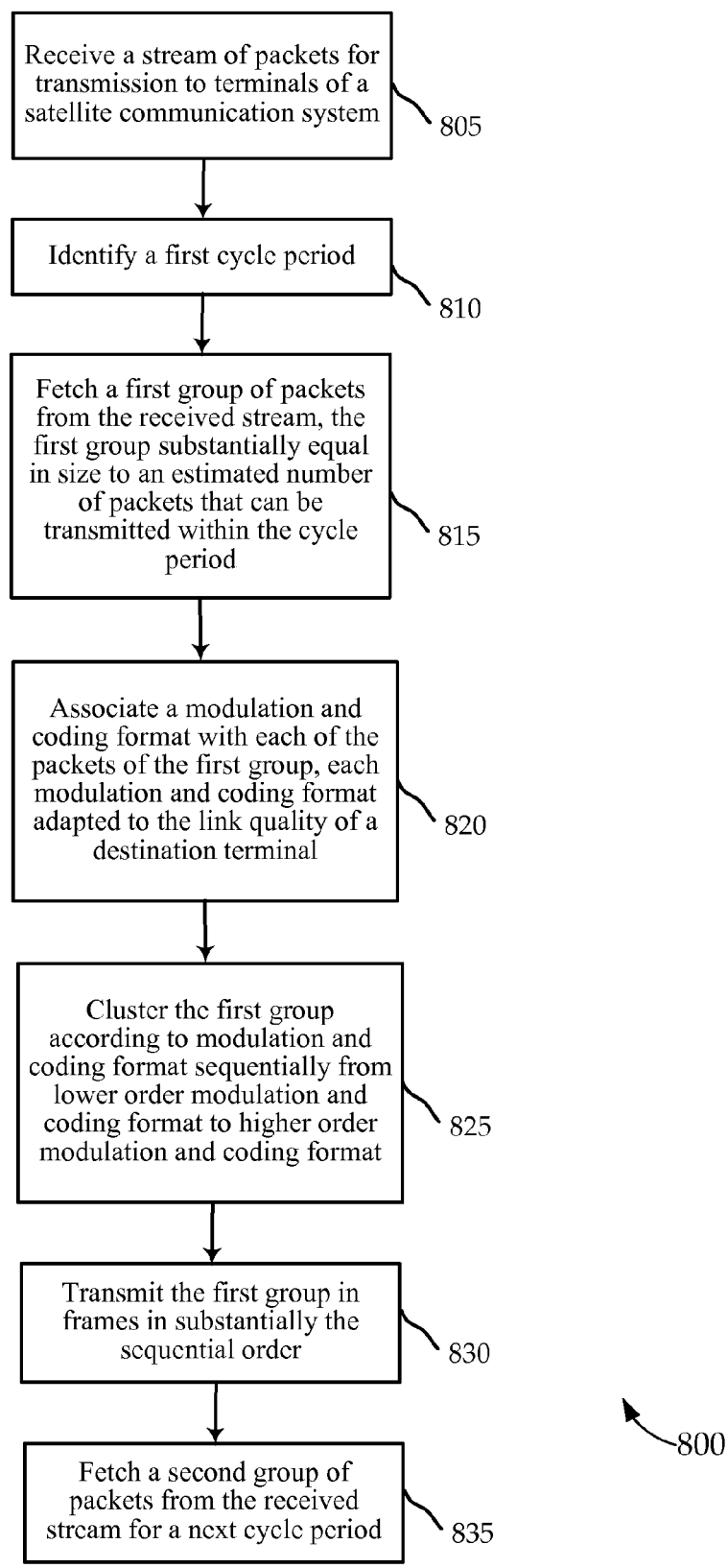
FIG. 8 is a flowchart illustrating a method of per-cycle fetching and transmission by modcode according to various embodiments of the invention.

FIG. 8 is a flowchart illustrating a method of per-cycle fetching and transmission by modcode according to various embodiments of the invention. The method 800 may, for example, be performed in whole or in part by the gateway 115 of FIG. 1 or 3 or the configuration 200 of FIG. 2. More specifically, the method 800 may be performed by the cluster module 210 of FIG. 2, 3, or 4.

At block 805, a stream of packets is received for transmission to terminals of a satellite communication system. At block 810, a first cycle period is identified. At block 815, a first group of packets is fetched from the received stream, the first group substantially equal in size to an estimated number of packets that can be transmitted within the cycle period. At block 820, a modcode is associated with each of the packets of the first group, each modcode adapted to the link quality of a destination terminal. At block 825, the first group is clustered according to modcode sequentially from lower order modcode to higher order modcode. At block 830, the first group is transmitted in frames in substantially the sequential order. At block 835, a second group of packets is fetched from the received stream for a next cycle period.

Figure 9:
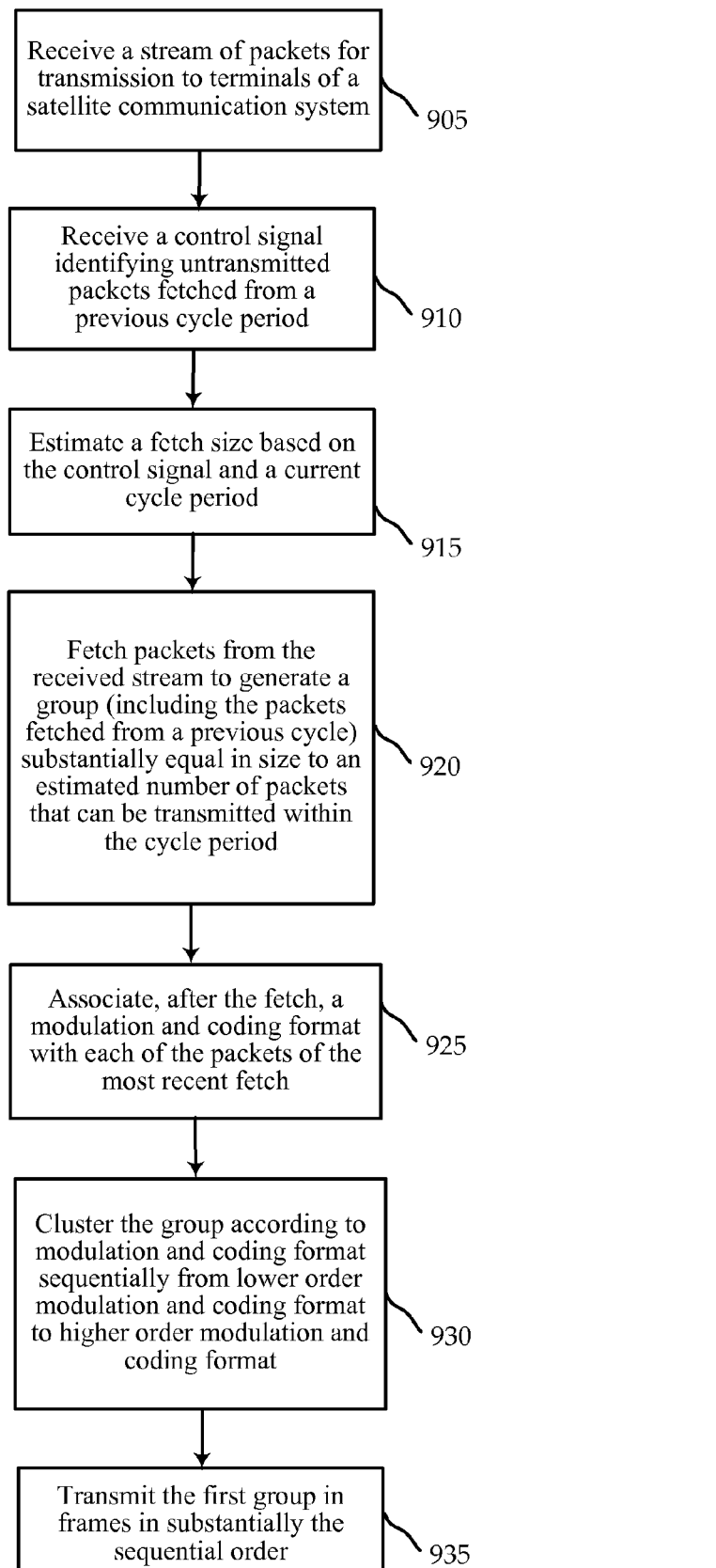
FIG. 9 is a flowchart illustrating a method of fetch size estimation and modcode clustering on a per-cycle basis according to various embodiments of the invention.

FIG. 9 is a flowchart illustrating a method 900 of fetch size estimation and modcode clustering on a per-cycle basis according to various embodiments of the invention. The method 900 may, for example, be performed in whole or in part by the gateway 115 of FIG. 1 or 3 or the configuration 200 of FIG. 2. More specifically, the method 900 may be performed by the cluster module 210 of FIG. 2, 3, or 4.

At block 905, a stream of packets is received for transmission to terminals of a satellite communication system. At block 910, a control signal is received identifying packets remaining to be transmitted fetched from a previous cycle period. At block 915, a fetch size is estimated based on the control signal and a current cycle period. At block 920, packets are fetched from the received stream to generate a group (including the packets fetched from a previous cycle) substantially equal in size to an estimated number of packets that can be transmitted within the cycle period. At block 925, after the fetch, a modcode is associated with each of the packets of the most recent fetch. At block 930, the group is clustered according to modcode sequentially from lower order modcode to higher order modcode. At block 935, the first group is transmitted in frames in substantially the sequential order.

Figure 10:
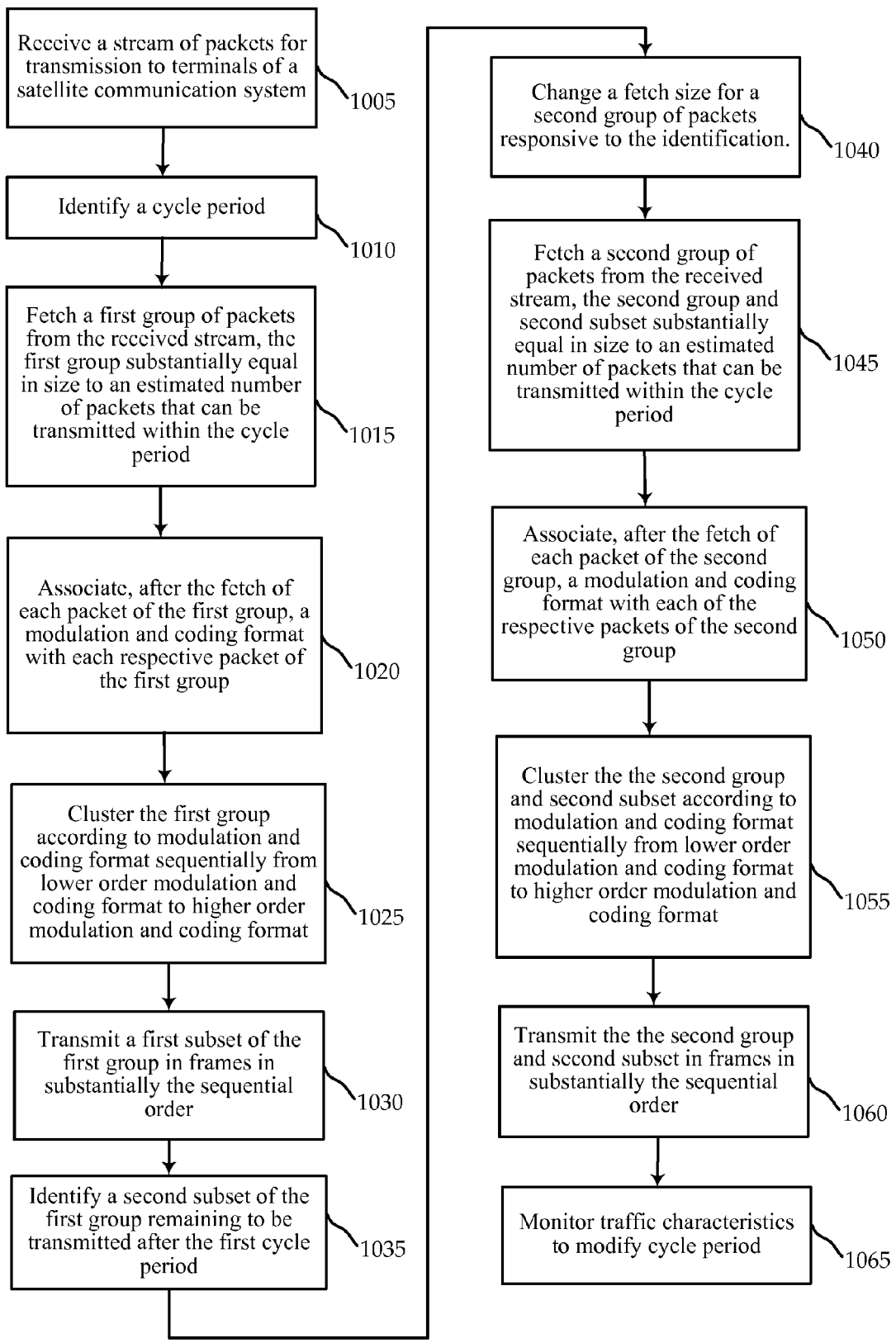
FIG. 10 is a flowchart illustrating a method of modcode clustering on a per-cycle basis according to various embodiments of the invention.

FIG. 10 is a flowchart illustrating a method 1000 of modcode clustering on a per-cycle basis according to various embodiments of the invention. The method 1000 may, for example, be performed in whole or in part by the gateway 115 of FIG. 1 or 3 or the configuration 200 of FIG. 2. More specifically, the method 1000 may be performed by the cluster module 210 of FIG. 2, 3, or 4.

At block 1005, a stream of packets is received for transmission to terminals of a satellite communication system. At block 1010, a cycle period is identified. At block 1015, a first group of packets is fetched from the received stream, the first group substantially equal in size to an estimated number of packets that can be transmitted within the cycle period. At block 1020, after the fetch of each packet of the first group, a modcode is associated with each respective packet of the first group.

At block 1025, the first group is clustered according to modcode sequentially from lower order modcode to higher order modcode. At block 1030, a first subset of the first group is transmitted in frames in substantially the sequential order. At block 1035, a second subset of the first group remaining to be transmitted after the first cycle period is identified. At block 1040, a fetch size for a second group of packets is changed responsive to the identification.

At block 1045, a second group of packets is fetched from the received stream, the second group and second subset substantially equal in size to an estimated number of packets that can be transmitted within the cycle period. At block 1050, after the fetch of each packet of the second group, a modcode is associated with each of the respective packets of the second group. At block 1055, the second group and second subset are clustered according to modcode sequentially from lower order modcode to higher order modcode. At block 1060, the second group and second subset are transmitted in frames in substantially the sequential order. At block 1065, traffic characteristics are monitored to modify the cycle period.

Transport Stream Identifier Reordering in an ACM System: In some embodiments, a stream of packets is received (e.g., the group of packets described above may be fetched).

The stream may be clustered according to modcode. Within each modcode cluster, the packets may be grouped according to transport stream identifier (e.g., PID) to produce a packet list. The packet list may be ordered sequentially from lower order modcode to higher order modcode. The packets may be fetched from the list for encapsulation (e.g., in MPEG-2 packets). Encapsulated packets may be transmitted in baseband frames.

Figure 11:
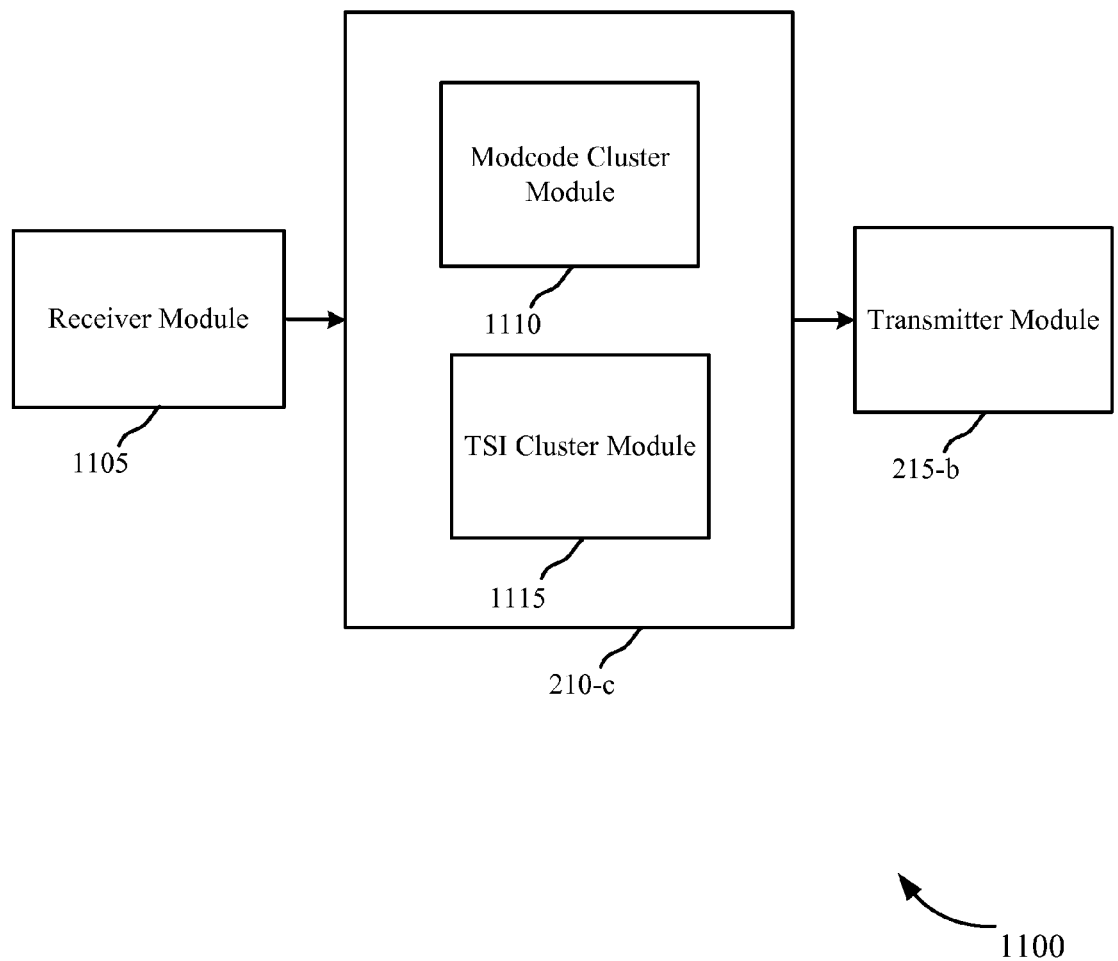
FIG. 11 is a block diagram illustrating an example configuration for transport stream identifier reordering in a satellite communication system according to various embodiments of the invention.

Turning to FIG. 11, a block diagram is shown illustrating an example configuration 1100 for transport stream identifier reordering in a satellite communications network. This configuration 1100 may be implemented in the system 100 of FIG. 1 or, more specifically, may be implemented in the gateway 115 of FIG. 1 or 3. The configuration may be the configuration 200 of FIG. 2. However, some or all of the functionality of this configuration may be implemented in other devices or sets of devices.

The configuration 1100 includes a receiver module 1105, a cluster module 210-c, and a transmitter module 215-b, which may each be in communication with each other. The cluster module 210-c includes a modcode cluster module 1110 and a transport stream identifier cluster module 1115. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 1105 may receive a stream of packets (e.g., the per-cycle group described above) for transmission to terminals of a satellite communication system (e.g., to terminals 130 of the system 100 of FIG. 1). The modcode cluster module 1110 may cluster packets of the received stream according to modcode. The transport stream identifier cluster module 1115 may cluster packets of the received stream of packets according to a transport stream identifier. The functions of the modcode cluster module 1110 and transport stream identifier cluster module 1115 may occur in any order (e.g., for each cycle, the clustering functions may be performed first by the modcode cluster module 1110 or the transport stream identifier cluster module 1115, or they may occur concurrently). The combined cluster module 210-c may generate a packet list with clustered packets for each modcode ordered substantially sequentially from lower order modcode to higher order modcode, the packets for each modcode further clustered in the packet list according to a transport stream identifier. The transmitter module 215-b may transmit at least a portion of the packets of the packet list in substantially the sequential order.

Figure 12:
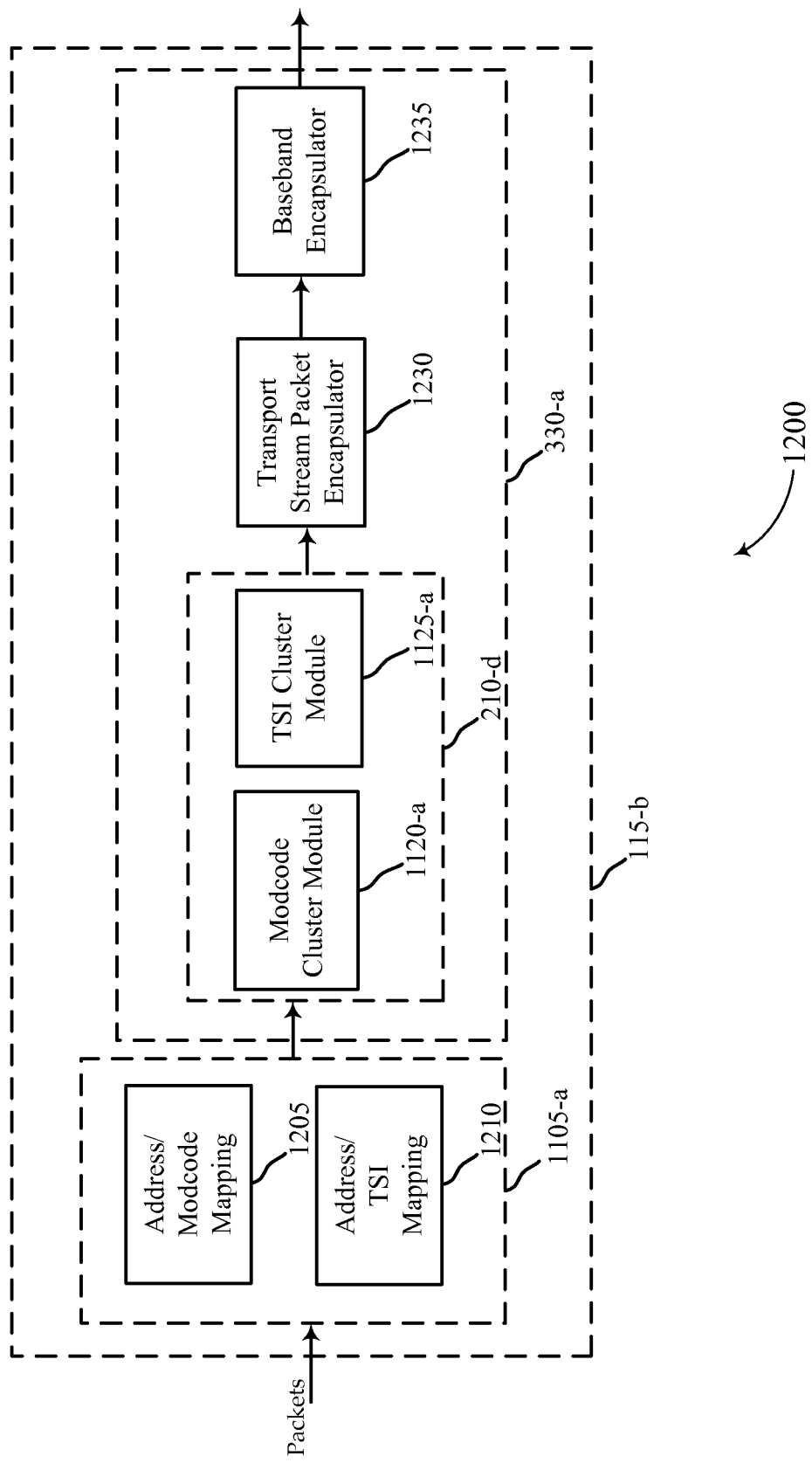
FIG. 12 is a block diagram illustrating an example gateway according to various embodiments of the invention.

Referring to FIG. 12, a simplified block diagram 1200 illustrates an example gateway 115-b according to various embodiments of the invention. This may be the gateway 115 of FIG. 1 or 3, encapsulating packets for transmission downstream with modcodes adapted to the link to which the packets are directed. This gateway 115-b may be the configuration 1100 of FIG. 11. In other embodiments, the gateway 115-b may be used in any number of different ACM implementations.

The gateway 115-b in this embodiment includes a receiver module 1105-a and encapsulator module 330-a. Within the receiver module 1105-a, there is an address/modcode mapping module 1205 and an address/TSI mapping module 1210. Within the encapsulator module 330-a, there is a cluster module 210-d, transport stream packet encapsulator 1230, and baseband encapsulator 1235. The cluster module 210-d includes a modcode cluster module 1120-a and a TSI cluster module 1125-a. These components may be implemented, in whole or in part, in hardware. Thus, they may be made up of one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. Each may also be implemented, in whole or in part, with instructions embodied in a computer-readable medium, formatted to be executed by one or more general or application specific processors. Thus, the gateway 115-b may include different types and configurations of memory (not shown), which may be integrated into the hardware or may be one or more separate components.

A receiver module 1105-a may receive a stream of packets. In one embodiment, during each cycle time (e.g., T=5 ms), the receiver module 1105-a may fetch or otherwise receive a group of ~T ms worth of data packets (e.g., IP or other data packets), as described with reference to FIG. 2 or 3. Different fetching procedures may be used in other embodiments. For each of the set of fetched packets, an address/modcode mapping module 1205 may map the address of the received packet to the appropriate modcode, and the address/TSI mapping module 1210 may map the address of the received packet to the appropriate transport stream identifier.

The set of packets may then be forwarded to or otherwise fetched by the encapsulation module 330-a, with a modcode and transport stream identifier associated with each respective packet. The set of packets (and any packets remaining from the previous cycle) may then be processed. The modcode cluster module 1120-a may receive the packets, and reorganize the packets into clusters according to modcode. The ordering may be from lower order modcode clusters to higher order modcode clusters, in the form of a packet list. The transport stream identifier cluster module 1125-a may receive the packet list, and then reorganize each modcode cluster according to transport stream identifier (e.g., by PID). Thus, within each modcode cluster, packets associated with the same PID may be placed together, in a packet list. While there is much discussion about the use of a packet list, other ordering schemes and prioritization may be used, as well.

Packets from the list may be fetched sequentially, and those with the same transport stream identifiers may be encapsulated together (e.g., packets with the same PIDs may be encapsulated in MPEG-2 packets) by transport stream packet encapsulator 1230. There may, therefore, be a stream of MPEG-2 packets, still clustered according to modcode. The baseband encapsulator 1235 may, for each modcode, then encapsulate groups of transport stream packets (e.g., MPEG-2 packets) in one or more baseband frames, with the order proceeding from lower order modcodes to higher order modcodes. Transport stream packets may have different transport stream identifiers in a given baseband frame.

Figure 13:
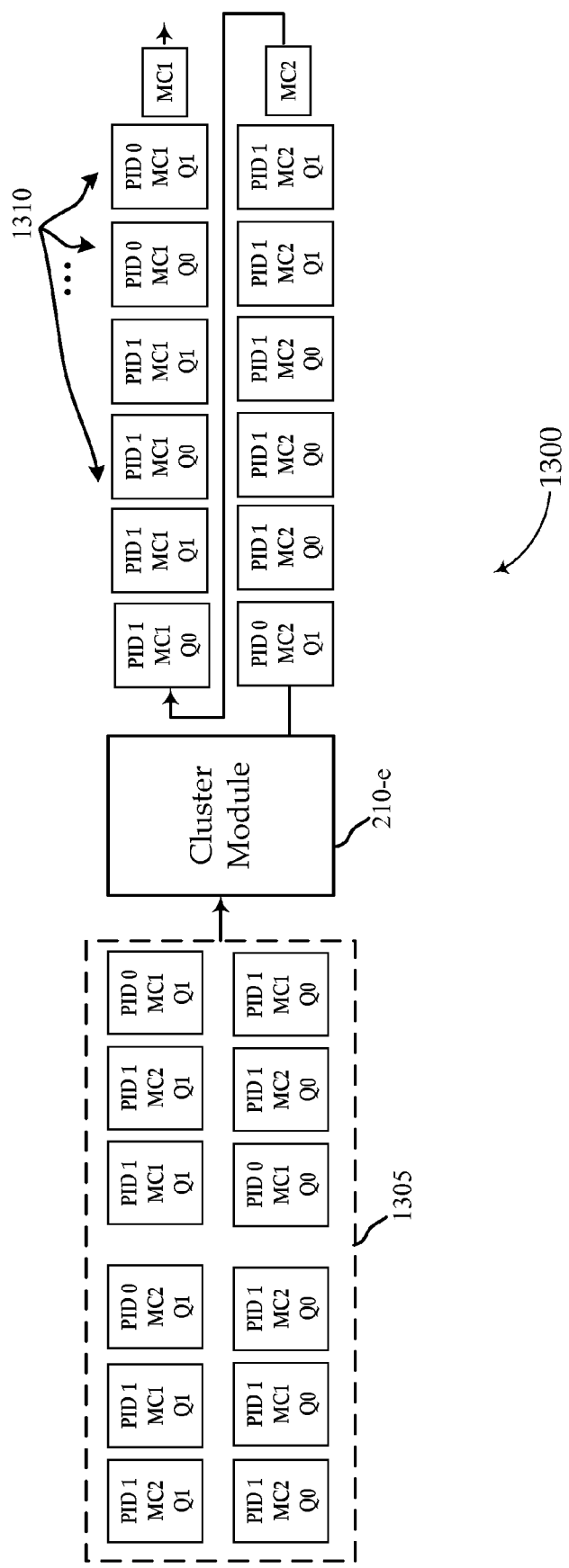
FIG. 13 is a diagram of modcode and transport stream identifier clustering illustrated via a packet diagram according to various embodiments of the invention.

Turning to FIG. 13, a simplified example of the modcode and transport stream identifier (e.g., PID) clustering described above is illustrated via a packet diagram 1300. The clustering may, for example, be performed by the cluster module 210 of FIG. 2, 3, 4, 11, or 12.

As noted above, a scheduler may forward a group of data packets 1305 to be transmitted during each cycle time T (e.g., T=10 ms). In one embodiment, the group of ~T ms packets is fetched from a scheduler, and a modcode is assigned for each (or a subset) of packets as they are fetched. In this way, the group size may be very close to ~T ms packets. In other embodiments, this may be only an estimate, as the modcode may or may not have been set for all or a subset of the packets. Initially, the group may be slightly greater than T to allow for more options with the packing efficiency. This may be the group of packets described with reference to FIG. 2, 3, or 4. The group forwarded each cycle may on average be substantially equal to the traffic transmitted for the cycle time. Each packet is associated with a (PID), a modcode (MC), and a QoS metric (Q). In the illustrated group 1305, the first row is Q1, and the second row is Q0, thus illustrating that the scheduler forwarded a group according to QoS parameters. However, the modcode and PID assignments for the group 1305 is mixed.

The cluster module 210-*e* may receive the group of packets 1305. When received by the cluster module 210-*e* in the illustrated embodiment, a modcode and PID are already associated with each respective packet (although the cluster module 210-*e* may assign the modcodes, as well). The cluster module 210-*e* reorganizes packets into clusters according to modcode. The ordering may be from lower order modcode clusters to higher order modcode. The cluster module 210-*e* may further reorganize each modcode cluster according to PID to generate an updated list 1310 ordered from lower order modcode clusters to higher order modcode clusters. Thus, within each modcode cluster, packets associated with the same PID are placed together, in a packet list 1310. Although described as a two step process, the steps may be combined, or the PID clustering may occur first or without modcode clustering.

Figure 14:
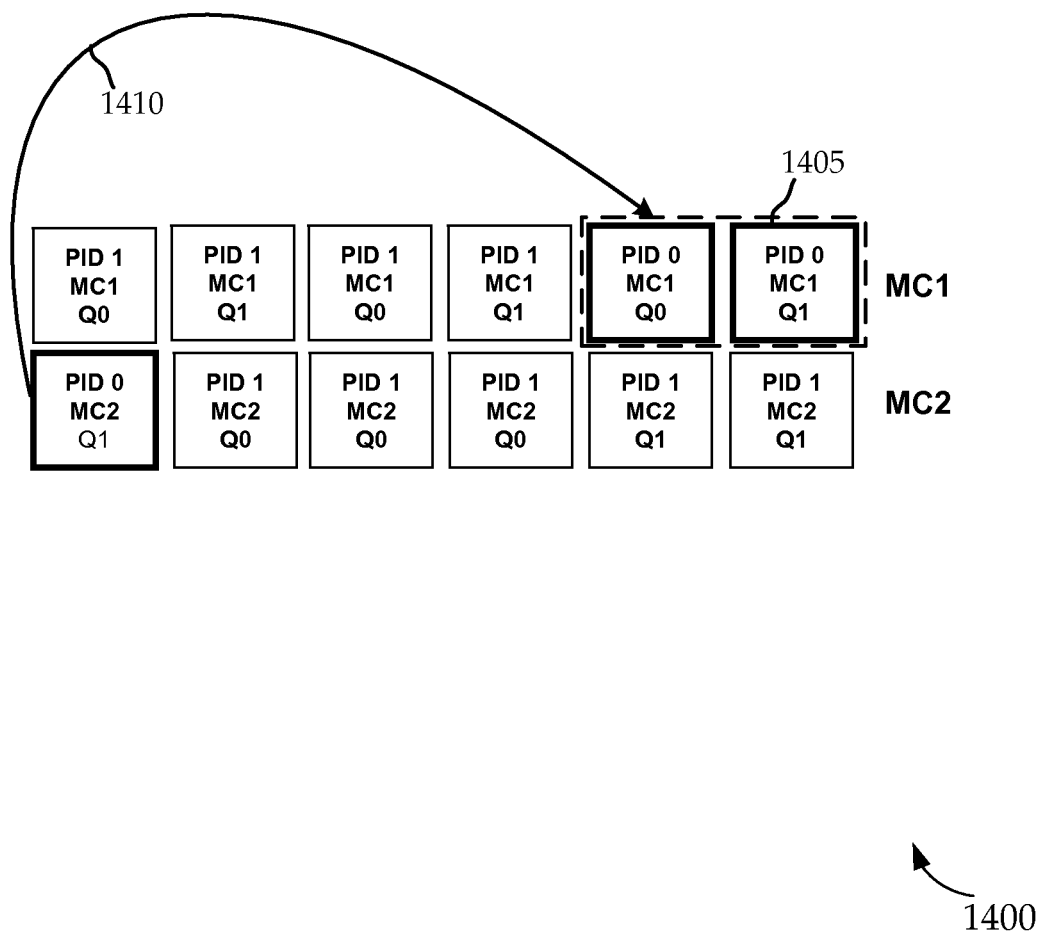
FIG. 14 is a diagram of modcode and transport stream identifier clustering according to various embodiments of the invention.

Turning to FIG. 14, a packet diagram 1400 illustrates another example of the modcode and transport stream identifier (e.g., PID) clustering. The clustering may, for example, be performed by the cluster module 210 of FIG. 2, 3, 4, 11, 12, or 13. The diagram illustrates how packets associated with different modcodes and a same transport stream identifier may be encapsulated in a single transport stream packet. In the illustrated embodiment, the modcode clustering and PID clustering has occurred. In the example, two packets 1405 are fetched to be encapsulated in an MPEG-2 packet, but the MPEG-2 packet is not full. Because MC2 is a higher order modcode than MC1, and there are no more packets in MC1 for PID 0 for that group, a packet for PID 0 may be fetched 1410 from the higher order modcode for placement into the MPEG-2 packet.

Figure 15:
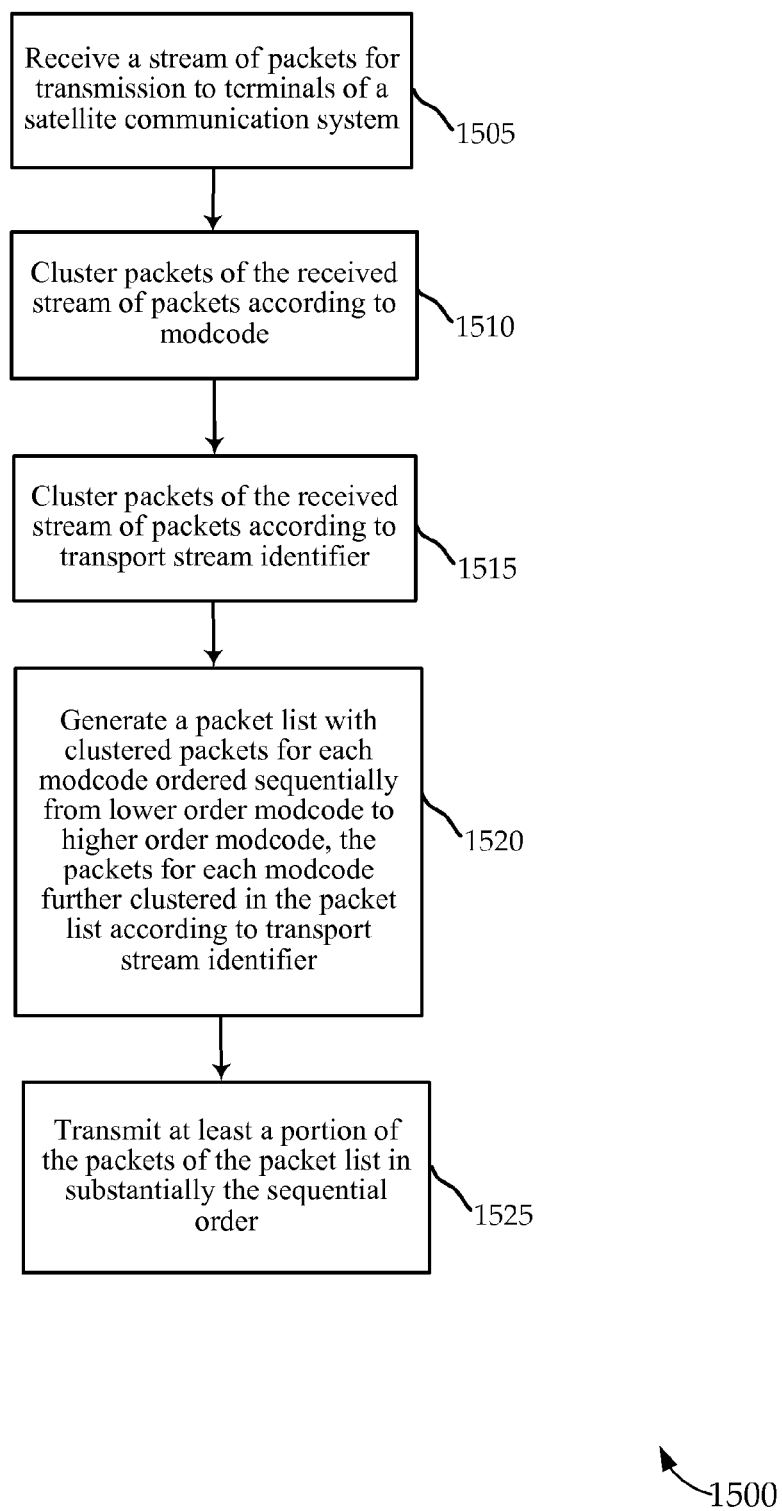
FIG. 15 is a flowchart illustrating a method of packet clustering according to various embodiments of the invention.

FIG. 15 is a flowchart illustrating a method 1500 of packet clustering according to various embodiments of the invention. The method 1500 may, for example, be performed in whole or in part by the gateway 115 of FIG. 1, 3, or 12, or the configuration 1100 of FIG. 11. More specifically, the method 1500 may be performed by the cluster module 210 of FIG. 2, 3, 4, 11, 12, or 13.

At block 1505, a stream of packets is received for transmission to terminals of a satellite communication system. At block 1510, packets of the received stream of packets are clustered according to modcode. At block 1515, packets of the received stream of packets are clustered according to a transport stream identifier. At block 1520, a packet list is generated with packets clusters for each modcode ordered sequentially from lower order modcode to higher order modcode, the packets for each modcode further clustered in the packet list according to the transport stream identifier. At block 1525, at least a portion of the packets of the packet list is transmitted in substantially the sequential order.

Figure 16:
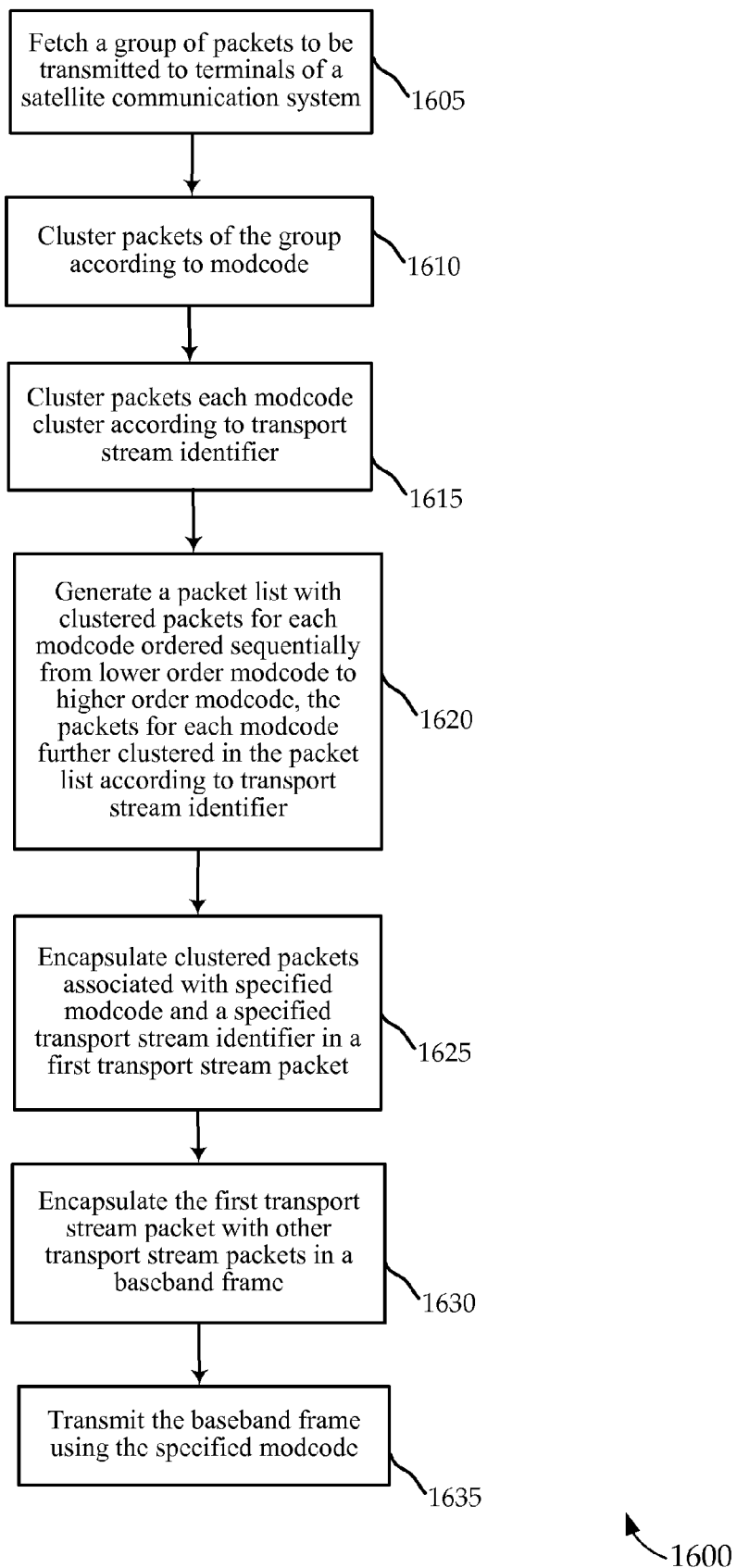
FIG. 16 is a flowchart illustrating a method of packet clustering and frame formation according to various embodiments of the invention.

FIG. 16 is a flowchart illustrating a method 1600 of packet clustering and frame formation according to various embodiments of the invention. The method 1600 may, for example, be performed in whole or in part by the gateway 115 of FIG. 1, 3, or 12, or the configuration 1100 of FIG. 11. More specifically, the method 1600 may be performed by the cluster module 210 of FIG. 2, 3, 4, 11, 12, or 13.

At block 1605, a group of packets to be transmitted to terminals of a satellite communication system is fetched. At block 1610, packets of the group are clustered according to modcode. At block 1615, packets of each modcode cluster are clustered according to the transport stream identifier.

At block 1620, a packet list is generated with packets clusters for each modcode ordered sequentially from lower order modcode to higher order modcode, the packets for each modcode further clustered in the packet list according to transport stream identifier. At block 1625, clustered packets associated with a specified modcode and a specified transport stream identifier are encapsulated in a first transport stream packet. At block 1630, the first transport stream packet is encapsulated with other transport stream packets in a baseband frame. At block 1635, the baseband frame using the specified modcode is transmitted.

Figure 17:
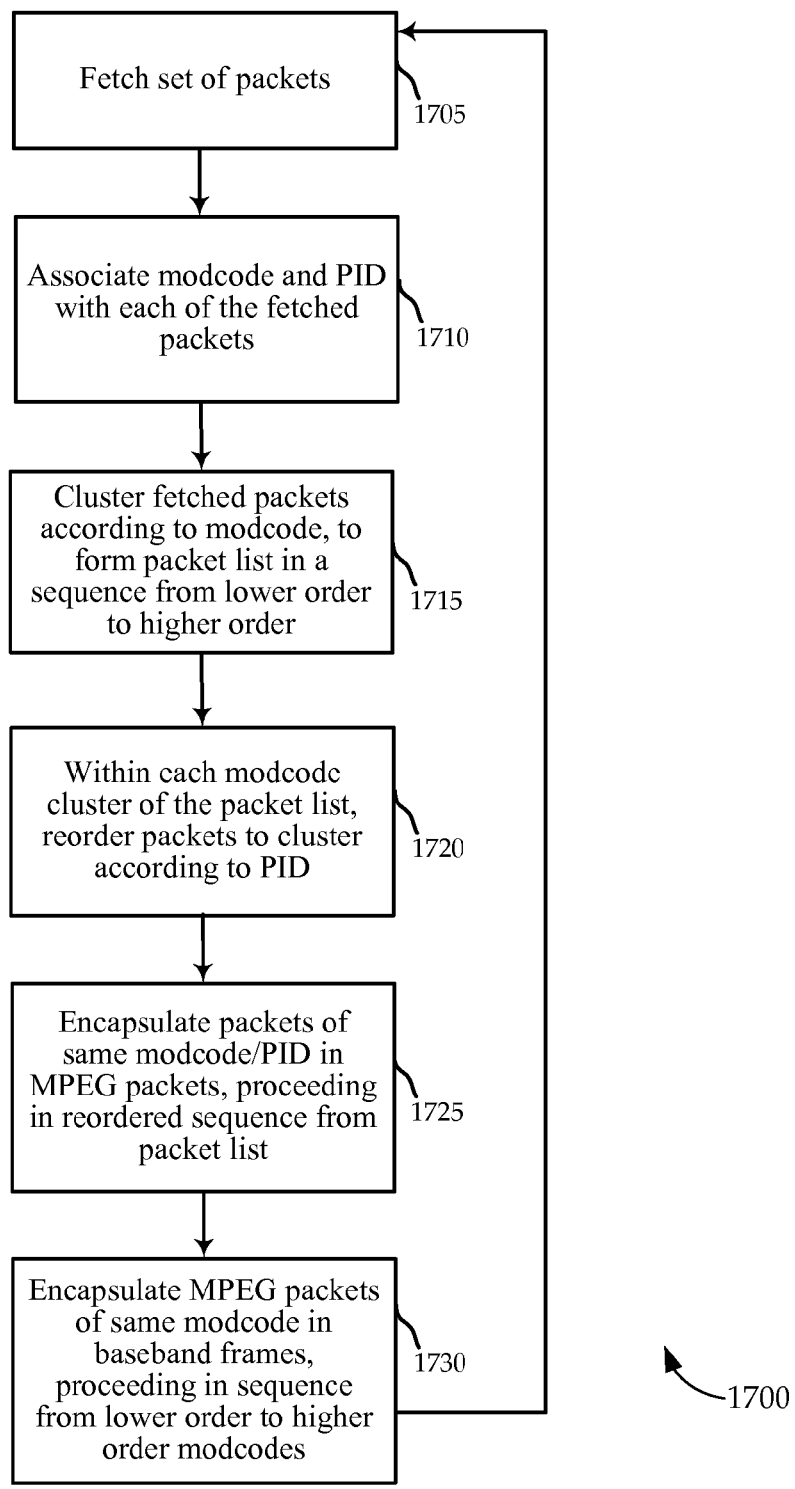
FIG. 17 is a flowchart illustrating a method of per-cycle packet clustering and frame formation according to various embodiments of the invention.

FIG. 17 is a flowchart illustrating a method 1700 of per-cycle packet clustering and frame formation according to various embodiments of the invention. The method 1700 may, for example, be performed in whole or in part by the gateway 115 of FIG. 1, 3, or 12, or the configuration 1100 of FIG. 11. More specifically, the method 1700 may be performed by the cluster module 210 of FIG. 2, 3, 4, 11, 12, or 13.

At block 1705, a set of packets is fetched. In one embodiment, this is the group of packets fetched on a per-cycle basis from the scheduler module 205 by the cluster module 210 of FIG. 2, 3, or 4. At block 1710, a modcode and a PID are associated with each of the fetched packets. At block 1715, fetched packets are clustered according to modcode to form a packet list in a sequence from lower order to higher order. At block 1720, packets are reordered within each modcode cluster to cluster according to a PID.

At block 1725, packets of the same modcode/PID are encapsulated in MPEG-2 packets, proceeding in reordered sequence from the packet list (from lower order to higher order modcode). At block 1730, MPEG-2 packets of the same modcode are encapsulated in baseband frames, the baseband frames proceeding in sequence from lower order to higher order modcodes. In some embodiments, MPEG-2 or other packets from higher order modcodes may be included in lower order modcodes to fill the frame. The process may return to block 1705 for a next cycle.

Figure 18:
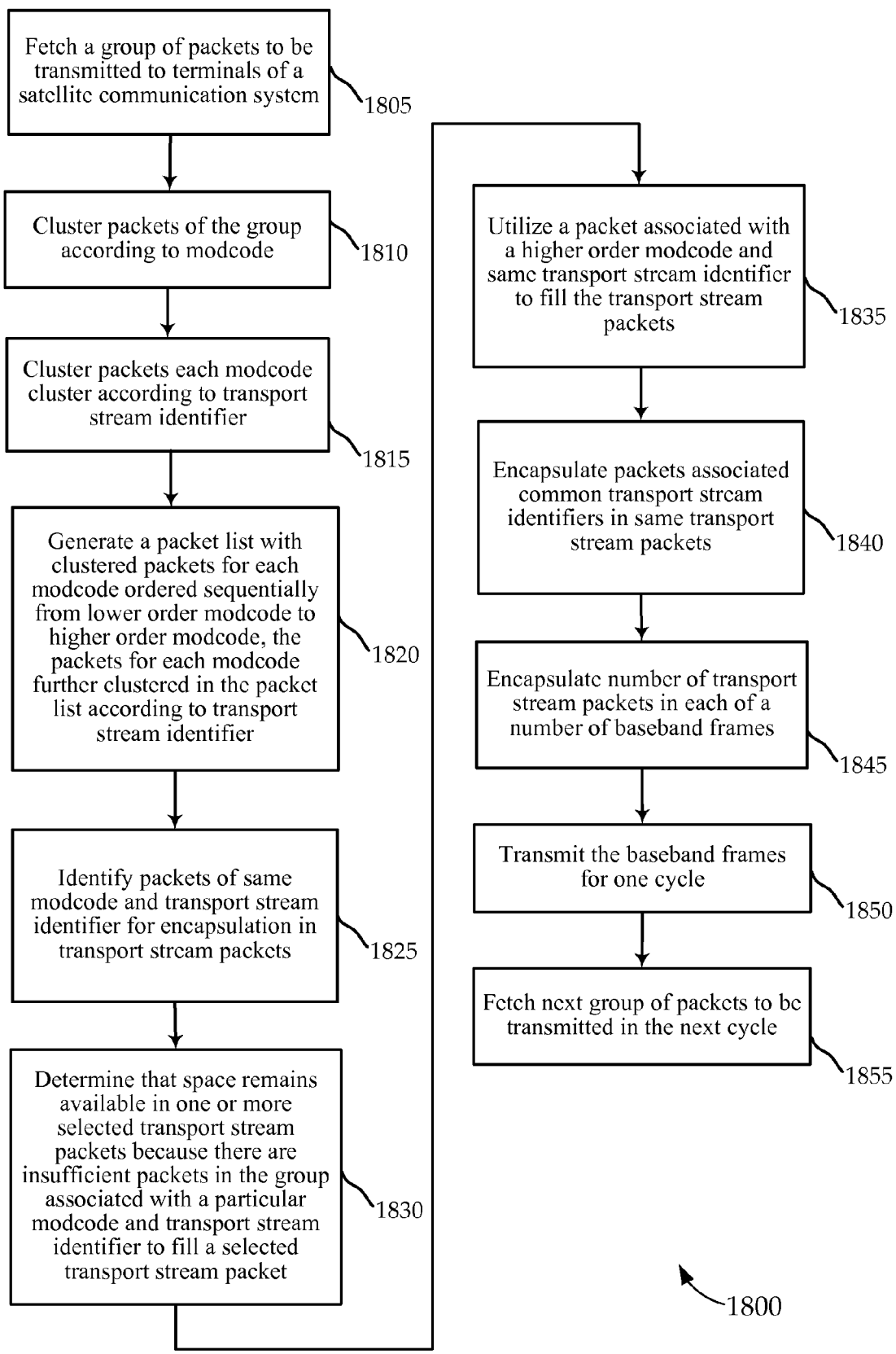
FIG. 18 is a flowchart illustrating an alternative method of per-cycle packet clustering and frame formation according to various embodiments of the invention.

FIG. 18 is a flowchart illustrating an alternative method 1800 of per-cycle packet clustering and frame formation according to various embodiments of the invention. The method 1800 may, for example, be performed in whole or in part by the gateway 115 of FIG. 1, 3, or 12, or the configuration 1100 of FIG. 11. More specifically, the method 1800 may be performed by the cluster module 210 of FIG. 2, 3, 4, 11, 12, or 13.

At block 1805, a group of packets to be transmitted to terminals of a satellite communication system is fetched. At block 1810, packets of the group are clustered according to modcode. At block 1815, packets of each modcode cluster are clustered according to a transport stream identifier. At block 1820, a packet list is generated with packets clustered for each modcode ordered sequentially from lower order modcode to higher order modcode, the packets for each modcode further clustered in the packet list according to transport stream identifier.

At block 1825, packets of the same modcode and transport stream identifier are identified for encapsulation in transport stream packets. At block 1830, a determination is made whether space remains available in one or more selected transport stream packets because there are insufficient packets in the group associated with a particular modcode and transport stream identifier to fill a selected transport stream packet. At block 1835, a packet associated with a higher order modcode and same transport stream identifier is utilized to fill the transport stream packets.

At block 1840, packets associated with common transport stream identifiers are encapsulated in the same transport stream packets. At block 1845, a number of transport stream packets is encapsulated in each of a number of baseband frames. At block 1850, the baseband frames for one cycle are transmitted. At block 1855, the next group of packets to be transmitted in the next cycle is fetched.

Frame Packing Techniques: Much of the above discussion has focused on modcode clustering on a per-cycle basis, and PID reordering within modcodes of an ACM system. There are, in addition, a number of alternative techniques that may be used for efficient frame packing Consider, for example, a list of packets to be transmitted. This may, but need not be, the clustered packet list 1310 described with reference to FIG. 13, fetched on a per-cycle basis. For purposes of example, assume that the list is clustered by modcode, and by PID within each modcode cluster, and that the list proceeds from lower order modcode to higher order modcode. From this packet list, a stream of MPEG-2 packets may be generated. There are a number of alternative frame packing techniques.

The stream of MPEG-2 packets (or, e.g., other packets) may then be packed into baseband frames, as described above. However, at the transition between modcodes, there may be additional space left unfilled within a baseband frame. There are a number of ways in which this may be managed. In one embodiment, if a baseband frame is left non-full, it will remain that way. There is no searching or back-tracking In another embodiment, if a baseband frame is left non-full, the packet list may be ordered so that the next MPEG-2 or other packets are assigned higher order modcodes, and they may be used to fill the frame. There is no searching or back-tracking In still other embodiments, if a baseband frame is left non-full, it may be held to a next cycle, and filled at that time. Various embodiments will now be addressed in more detail.

Figure 19:
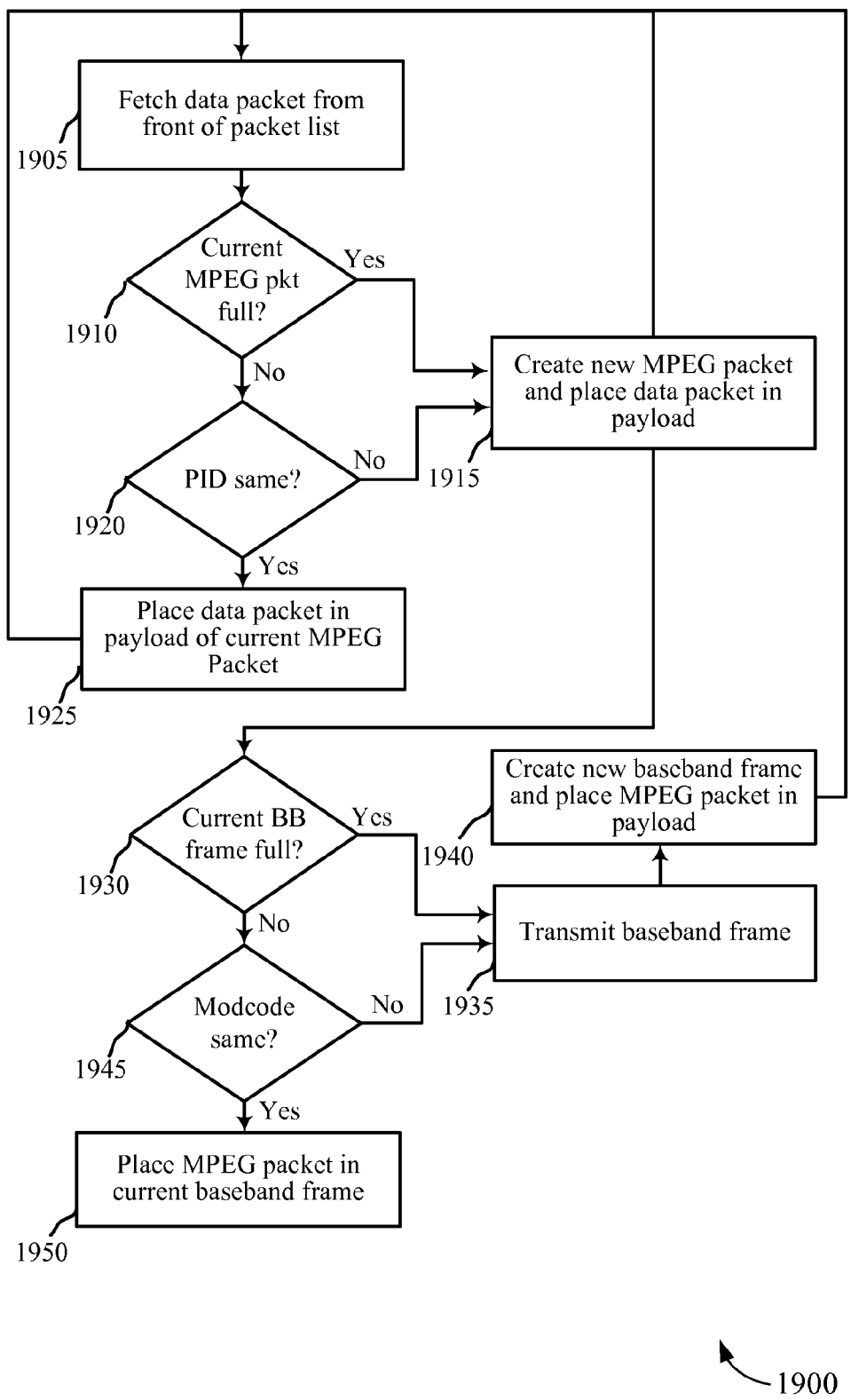
FIG. 19 is a flowchart illustrating a method of frame packing according to various embodiments of the invention.

FIG. 19 is a flowchart illustrating a method 1900 of frame packing, according to various embodiments of the invention. The method 1900 may, for example, be performed in whole or in part by the gateway 115 of FIG. 1, 3, or 12 or, more specifically, by the encapsulation module 330 of FIG. 3 or 12.

At block 1905, a data packet is fetched from the front of a packet list. At block 1910, a determination is made whether the current MPEG-2 packet is full. If not, at block 1920, a determination is made whether the PID of the fetched data packet is the same as the MPEG-2 packet. If so, at block 1925, the fetched packet is placed in the payload of a current MPEG-2 packet, and the process returns to block 1905.

If either the current MPEG-2 packet is full or the PID is different, the process diverges: 1) at block 1915, a new MPEG-2 packet is created and the fetched packet is placed in payload, and one prong of the process returns to block 1905, and 2) the MPEG-2 packet that is filled or has a different PID, a second prong of the process occurs where that MPEG-2 packet is placed in a baseband frame.

At block 1930, a determination is made whether the current baseband frame is full. If not, at block 1945, a determination is made whether the modcode is the same. If so, at block 1950, the MPEG-2 packet is placed in a current baseband frame.

If either the current baseband frame is full or the modcode is different, the process differs: at block 1935, the baseband frame is ready for transmission, and the PL header may be appended. At block 1940, a new baseband frame is created and the MPEG-2 packet is placed in a payload, and the process returns to block 1905.

Figure 20:
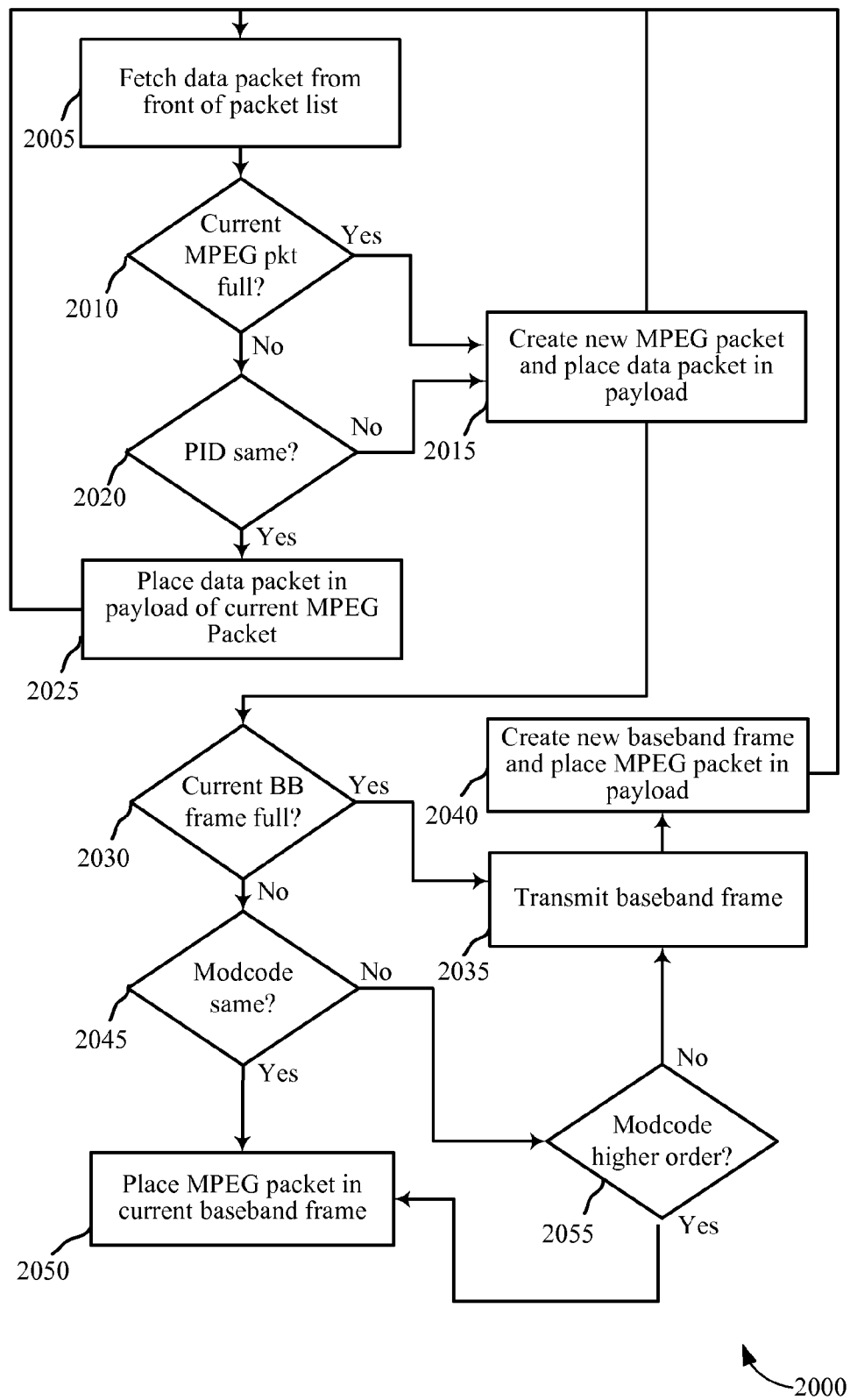
FIG. 20 is a flowchart illustrating an alternative method of frame packing according to various embodiments of the invention.

FIG. 20 is a flowchart illustrating a method 2000 of frame packing, according to various embodiments of the invention. The method 2000 may, for example, be performed in whole or in part by the gateway 115 of FIG. 1, 3, or 12 or, more specifically, by the encapsulation module 330 of FIG. 3 or 12.

At block 2005, a data packet is fetched from the front of a packet list. At block 2010, a determination is made whether the current MPEG-2 packet is full. If not, at block 2020, a determination is made whether the PID of the fetched data packet is the same as the MPEG-2 packet. If so, at block 2025, the fetched packet is placed in the payload of a current MPEG-2 packet, and the process returns to block 2005.

If either the current MPEG-2 packet is full or the PID is different, the process diverges: 1) at block 2015, a new MPEG-2 packet is created and the fetched packet is placed in payload, and one prong of the process returns to block 2005, and 2) the MPEG-2 packet that is filled or has a different PID, a second prong of the process occurs where that MPEG-2 packet is placed in a baseband frame.

At block 2030, a determination is made whether the current baseband frame is full. If not, at block 2045, a determination is made whether the modcode is the same. If so, at block 2050, the MPEG-2 packet is placed in a current baseband frame.

If the modcode is different, at block 2055, a determination is made whether the modcode of the MPEG-2 packet to be added is a higher order than the current baseband frame. If so, at block 2050, the MPEG-2 packet is placed in the current baseband frame. If the determination at block 2055 is that the modcode of the MPEG-2 packet is not of higher order, or it is determined that the baseband frame is full, the process turns to block 2035 because the current baseband frame is ready for transmission, and the PL header is to be appended. At block 2040, a new baseband frame is created and the current MPEG-2 packet is placed in the payload, and the process returns to block 2005.

Figure 21:
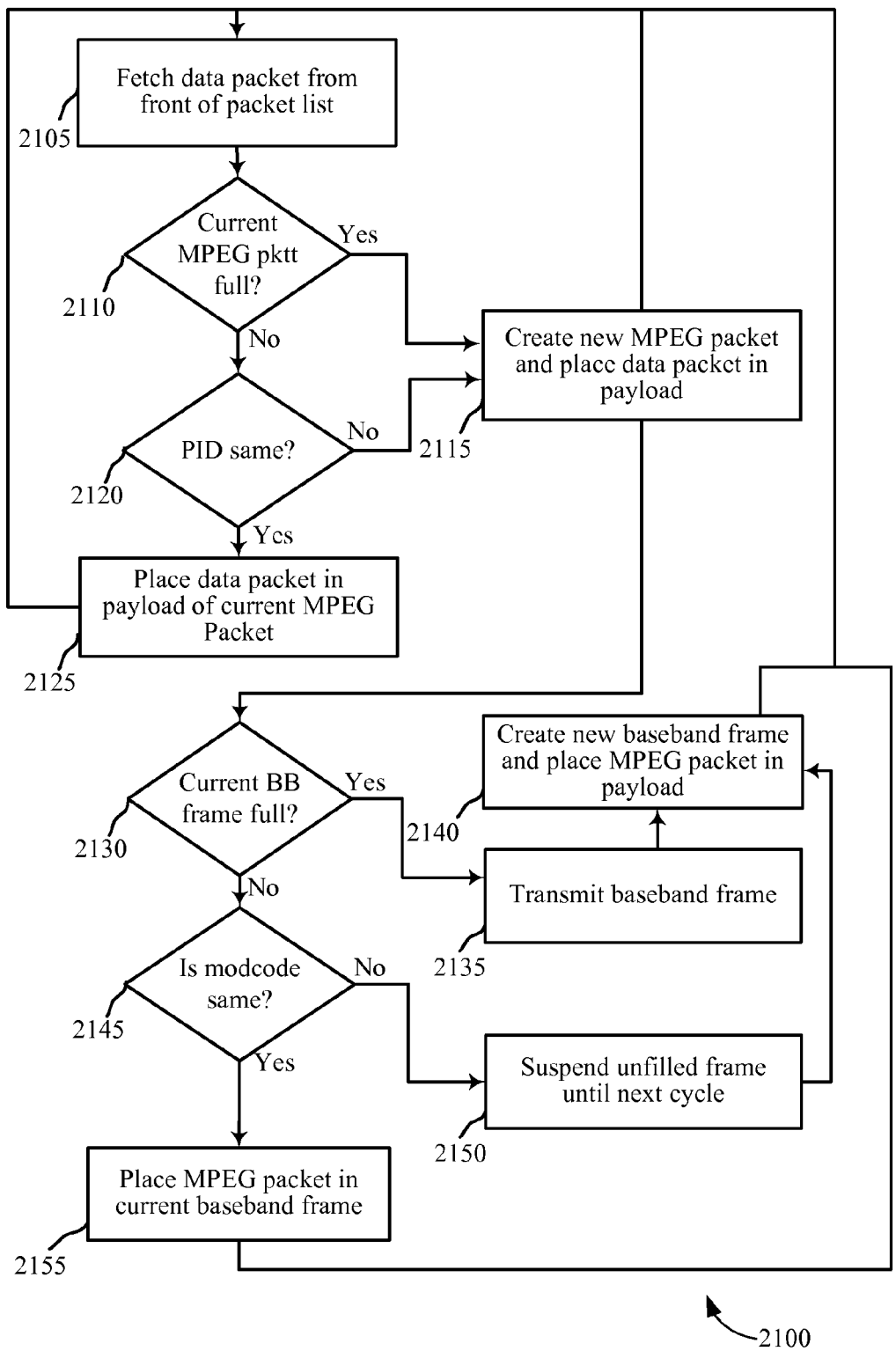
FIG. 21 is a flowchart illustrating yet another method of frame packing according to various embodiments of the invention.

FIG. 21 is a flowchart illustrating a method 2100 of frame packing, according to various embodiments of the invention. The method 2100 may, for example, be performed in whole or in part by the gateway 115 of FIG. 1, 3, or 12 or, more specifically, by the encapsulation module 330 of FIG. 3 or 12.

At block 2105, a data packet is fetched from the front of a packet list. At block 2110, a determination is made whether the current MPEG-2 packet is full. If not, at block 2120, a determination is made whether the PID of the fetched data packet is the same as the MPEG-2 packet. If so, at block 2125, the fetched packet is placed in the payload of a current MPEG-2 packet, and the process returns to block 2105.

If either the current MPEG-2 packet is full or the PID is different, the process diverges: 1) at block 2115, a new MPEG-2 packet is created and the fetched packet is placed in payload, and one prong of the process returns to block 2105, and 2) the MPEG-2 packet that is filled or has a different PID, a second prong of the process occurs where that MPEG-2 packet is placed in a baseband frame.

At block 2130, a determination is made whether the current baseband frame is full. If so, at block 2135, the baseband frame is ready for transmission, and the PL header may be appended. If not, at block 2145, a determination is made whether the modcode for the MPEG-2 packet is the same as the baseband frame. If the modcodes are different, at block 2150, the unfilled frame is suspended until the next cycle (perhaps with some precedence, or with a timer to avoid delay beyond a threshold). After the baseband frame is suspended (or if the frame was full and is set to be transmitted according to blocks 2130 and 2135), at block 2140, a new baseband frame is created and the MPEG-2 packet is placed in the payload. If it is determined at block 2145 that the modcodes are the same for the MPEG-2 packet and baseband frame, the MPEG-2 packet is placed therein. The process then returns to block 2105.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for clustering packets for transmission, the method comprising:
    receiving a scheduled stream of packets for transmission to terminals of a satellite communication system, the scheduled stream of packets prioritized in an order for fetching according to a queuing scheme;
    identifying a first cycle period corresponding to a predetermined time period for transmission of a group of packets in frames;
    fetching a first group of packets from the received scheduled stream of packets according to the prioritized order, the first group fetched according to an estimated number of packets that can be transmitted within the cycle period;
    associating, after fetching the first group of packets, a modulation and coding format with each of the packets of the first fetched group, each modulation and coding format adapted to the link quality of a destination terminal;
    clustering the first fetched group of packets according to the associated modulation and coding formats sequentially from lower order modulation and coding format to higher order modulation and coding format;
    selecting, in the sequential order, packets from the clustered group of packets for encapsulation in payloads of a first plurality of frames, each frame of the first plurality of frames associated with a modulation and coding format;
    transmitting the first plurality of frames in an order corresponding to the sequential order, the payload for each transmitted frame transmitted according to the modulation and coding format associated with the frame; and
    fetching a second group of packets from the received stream for a next cycle period.

2. The method of claim 1, wherein transmitting the first plurality of frames comprises:
    transmitting a first subset of the first group of packets during the first cycle period.

3. The method of claim 2, further comprising:
    identifying a second subset of the first group remaining to be transmitted after the first cycle period; and
    changing a fetch size for the second group of packets responsive to the identification.

4. The method of claim 2, further comprising:
    transmitting, during the next cycle period, a second plurality of frames comprising the second group of packets and a second subset of the first group remaining to be transmitted after the first cycle period.

5. The method of claim 1, further comprising:
    estimating a fetch size for the first group responsive to control information received from a previous cycle period.

6. The method of claim 1, wherein a subset of the first group comprises packets remaining to be transmitted from a previous cycle period.

7. The method of claim 1, further comprising:
    determining a modulation and coding format to be associated with each of the first group of packets, the determination made after the first group is fetched.

8. The method of claim 1, wherein the received scheduled stream of packets is scheduled in the order for fetching according to a quality of service associated with the received scheduled stream of packets.

9. The method of claim 1, wherein the received scheduled stream of packets is scheduled according to one or more of weighted fair queueing (WFQ), random early detection (RED), strict priority scheduling (SPS), or first-in first-out (FIFO) techniques.

10. The method of claim 1, further comprising:
monitoring characteristics of the received stream of packets; and
modifying the cycle period responsive to the monitored characteristics.

11. The method of claim 1, further comprising:
identifying a first modulation and coding format for a frame for transmitting packets of the first group during the first cycle period;
determining that space remains available in the frame because there are insufficient packets associated with the first modulation and coding format in the first group to fill the frame; and
utilizing packets from a second modulation and coding format of higher order than the first modulation and coding format to fill the frame.

12. A system for clustering packets for transmission, the system comprising:
a scheduler module configured to receive a stream of packets for transmission to terminals of a satellite communication system and schedule the received stream of packets in a prioritized order for fetching according to a queuing scheme;
a cluster module, communicatively coupled with the scheduler module, and configured to:
identify a first cycle period corresponding to a predetermined time period for transmission of a group of packets in frames;
fetch a first group of packets from the scheduled stream of packets, the first group fetched according to an estimated number of packets that can be transmitted within the cycle period;
associate, after fetching the first group of packets, a modulation and coding format with each of the packets of the first fetched group, each modulation and coding format adapted to the link quality of a destination terminal;
cluster the first fetched group of packets according to the associated modulation and coding formats in sequential order from lower order modulation and coding format to higher order modulation and coding format; and
fetch a second group of packets from the scheduled stream for a next cycle period;
a frame formation module, communicatively coupled with the cluster module, and configured to select, in the sequential order, packets from the clustered group of packets for encapsulation in payloads of a first plurality of frames, each frame of the first plurality of frames associated with a modulation and coding format; and
a transmitter module, communicatively coupled with the frame formation module, and configured to transmit the first plurality of frames in an order corresponding to the sequential order, the payload for each transmitted frame transmitted according to the modulation and coding format associated with the frame.

13. The system of claim 12, wherein the transmitter module is configured to transmit the first plurality of frames by:
transmitting a first subset of the first group of packets during the first cycle period; and
transmitting, after the first cycle period, a second subset of the first group remaining to be transmitted after the first cycle period.

14. The system of claim 13, wherein the cluster module is further configured to:
change a fetch size for the second group of packets responsive to a size of the second subset.

15. The system of claim 13, wherein the transmitter module is further configured to:
transmit, during the next cycle period, a second plurality of frames comprising the second group of packets and the second subset.

16. The system of claim 12, wherein the cluster module is further configured to:
estimate a fetch size for the first group responsive to control information received from a previous cycle period.

17. The system of claim 12, wherein a subset of the first group comprises packets remaining to be transmitted from a previous cycle period.

18. The system of claim 12, wherein the cluster module is further configured to:
determine a modulation and coding format to be associated with each of the first group of packets, the determination made for each packet after each respective packet is fetched.

19. The system of claim 12, wherein the scheduler module is further configured to:
schedule the prioritized order for fetching according to a quality of service associated with the received stream of packets.

20. The system of claim 12, wherein the cluster module is further configured to:
monitor characteristics of the received stream of packets; and
modify the cycle period responsive to the monitored characteristics.

21. The system of claim 12, wherein the cluster module is further configured to:
determine that space remains available in a frame because there are insufficient packets associated with a first modulation and coding format in the first group to fill the frame; and
utilize packets from a second modulation and coding format of higher order than the first modulation and coding format to fill the frame for transmission during the first cycle period.

22. The system of claim 12, wherein the system comprises a gateway.

23. A device for clustering packets for transmission, the device comprising:
means for receiving a scheduled stream of packets for transmission to terminals of a satellite communication system, the scheduled stream of packets prioritized in an order for fetching according to a queuing scheme;
means for fetching a first group of packets from the received scheduled stream of packets, the first group fetched according to an estimated number of packets that can be transmitted within an identified cycle period corresponding to a predetermined time period for transmission of a group of packets in frames;
means for associating, after fetching the first group of packets, a modulation and coding format with each of the packets of the first fetched group, each modulation and coding format adapted to the link quality of a destination terminal;
means for clustering the first fetched group of packets according to the associated modulation and coding formats sequentially from lower order modulation and coding format to higher order modulation and coding format;
means for selecting, in the sequential order, packets from the clustered group of packets for encapsulation in payloads of a first plurality of frames, each frame of the first plurality of frames associated with a modulation and coding format;
means for transmitting the first plurality of frames in an order corresponding to the sequential order, the payload for each transmitted frame transmitted according to the modulation and coding format associated with the frame; and
means for fetching a second group of packets from the received stream for a next cycle period.

24. The device of claim 23, further comprising:
means for estimating a fetch size for the first group responsive to control information received from a previous cycle period.

25. The device of claim 23, further comprising:
means for determining a modulation and coding format to be associated with each of the first group of packets, the determination made for each packet after each respective packet is fetched.

26. The device of claim 23, further comprising:
means for scheduling the order for fetching according to a quality of service associated with the received stream of packets, wherein the scheduled order is determined before a modulation and coding format is determined for each packet.

27. A method for clustering packets for transmission, the method comprising:
receiving a scheduled stream of packets for transmission to terminals of a satellite communication system, the scheduled stream of packets prioritized in an order for fetching according to a queuing scheme;
fetching a first group of packets from the received scheduled stream of packets according to the prioritized order, the first group fetched according to an estimated number of packets that can be transmitted within a cycle period, the cycle period corresponding to a predetermined time period for transmission of a group of packets;
associating, after fetching the first group of packets, a modulation and coding format with each of the packets of the first fetched group, each modulation and coding format adapted to the link quality of a destination terminal;
clustering the first fetched group of packets according to the associated modulation and coding format;
clustering the first group of packets of the received stream of packets according to transport stream identifier;
generating a packet list for the first group of packets with clustered packets for each modulation and coding format ordered sequentially from lower order modulation and coding format to higher order modulation and coding format, the packets for each modulation and coding format further clustered in the packet list according to transport stream identifier; and
transmitting at least a portion of the first group of packets of the packet list in a plurality of baseband frames in the sequential order, each baseband frame associated with a modulation and coding format.

28. The method of claim 27, further comprising:
encapsulating clustered packets of a same modulation and coding format and a same transport stream identifier in a first transport stream packet; and
encapsulating the first transport stream packet with other transport stream packets in a baseband frame of the plurality of baseband frames transmitted according to the same modulation and coding format,
wherein the transmitting step comprises transmitting the baseband frame.

29. The method of claim 28, wherein at least a subset of the other transport stream packets have different transport stream identifiers from the first transport stream packet.

30. The method of claim 28, wherein, the first transport stream packet comprises a Moving Pictures Expert Group-2 (MPEG-2) packet; and
the baseband frame comprises a Digital Video Broadcast-Second Generation (DVB-S2) baseband frame.

31. The method of claim 27, further comprising:
encapsulating clustered packets associated with a second modulation and coding format of higher order than a first modulation and coding format in a baseband frame of the plurality of baseband frames;
wherein the transmitting step comprises transmitting the baseband frame according to the first modulation and coding format.

32. The method of claim 27, further comprising:
encapsulating packets associated with different modulation and coding formats and a same transport stream identifier in a first transport stream packet.

33. The method of claim 32, wherein the encapsulating comprises:
determining that space remains available in the first transport stream packet because there are insufficient packets associated with a first modulation and coding format and first transport stream identifier to fill the transport stream packet; and
utilizing a packet associated with a second modulation and coding format and first transport stream identifier to fill the transport stream packet, the second modulation and coding format of higher order than the first modulation and coding format.

34. The method of claim 27, wherein the clustering of the first fetched group of packets of the received scheduled stream of packets according to transport stream identifier comprises:
identifying sets of the received scheduled stream of packets clustered according to the modulation and coding format; and
clustering each set according to the transport stream identifier.

35. The method of claim 27, wherein the clustering of the first fetched group of packets of the received scheduled stream of packets according to modulation and coding format comprises:
identifying sets of the received scheduled stream of packets clustered according to transport stream identifier; and
clustering each set according to modulation and coding format.

36. The method of claim 27, further comprising:
fetching, for a second cycle period, a second group of packets from the received scheduled stream of packets, wherein the fetched second group and packets remaining to be transmitted from the first group are clustered according to modulation and coding format and transport stream identifier after the second group is fetched.

37. The method of claim 27,
wherein the received scheduled stream of packets is scheduled in the order for the fetching according to a quality of service associated with the received scheduled stream of packets.

38. A device for clustering packets for transmission, the device comprising:
a receiver module configured to receive a scheduled stream of packets for transmission to terminals of a satellite communication system, the scheduled stream of packets prioritized in an order for fetching according to a queuing scheme;
a cluster module, communicatively coupled with the receiver module, configured to:
identify a first cycle period corresponding to a predetermined time period for transmission of a group of packets in frames;
fetch a first group of packets from the scheduled stream of packets, the first group fetched according to an estimated number of packets that can be transmitted within the cycle period;
associate, after fetching the first group of packets, a modulation and coding format with each of the packets of the first fetched group, each modulation and coding format adapted to the link quality of a destination terminal;
cluster the first fetched group of packets of the scheduled stream of packets according to modulation and coding format;
cluster the first fetched group of packets of the scheduled stream of packets according to transport stream identifier; and
generate a packet list for the first fetched group of packets with clustered packets for each modulation and coding format ordered sequentially from lower order modulation and coding format to higher order modulation and coding format, the packets for each modulation and coding format further clustered in the packet list according to transport stream identifier; and
a transmitter module, communicatively coupled with the cluster module, and configured to transmit at least a portion of the first fetched group of packets of the packet list in a plurality of baseband frames in the sequential order, each baseband frame associated with a modulation and coding format.

39. The device of claim 38, further comprising:
a first encapsulator, communicatively coupled with the cluster module, and configured to encapsulate clustered packets of a same modulation and coding format and a same transport stream identifier in a first transport stream packet; and
a second encapsulator, communicatively coupled with the first encapsulator and the transmitter module, configured to encapsulate the first transport stream packet with other transport stream packets in a baseband frame of the plurality of baseband frames to be transmitted according to the same modulation and coding format.

40. The device of claim 39, wherein the second encapsulator is further configured to select the other transport stream packets for encapsulation in the baseband frame, the other transport stream packets having different transport stream identifiers from the first transport stream packet.

41. The device of claim 39, wherein the first transport stream packet comprises a Motion Pictures Expert Group-2 (MPEG-2) packet; and the baseband frame comprises a Digital Video Broadcast-Second Generation (DVB-S2) baseband frame.

42. The device of claim 38, further comprising an encapsulator, communicatively coupled with the cluster module and the transmitter module, and configured to:
encapsulate clustered packets associated with a second modulation and coding format of higher order than a first modulation and coding format in a baseband frame of the plurality of baseband frames for transmission according to the first modulation and coding format.

43. The device of claim 38, further comprising an encapsulator, communicatively coupled with the cluster module and the transmitter module, and configured to:
encapsulate packets of the first group of packets associated with different modulation and coding formats and a same transport stream identifier in a first transport stream packet.

44. The device of claim 43, wherein the encapsulator is further configured to:
determine that space remains available in the first transport stream packet because there are insufficient packets associated with a first modulation and coding format and first transport stream identifier to fill the transport stream packet; and
utilize a packet associated with a second modulation and coding format and first transport stream identifier to fill the transport stream packet.

45. The device of claim 38, wherein the cluster module is configured to cluster packets according to transport stream identifier by:
identifying sets of the scheduled stream of packets clustered according to the modulation and coding format; and
clustering each set according to the transport stream identifier.

46. The device of claim 38, wherein the cluster module is configured to cluster packets according to modulation and coding format comprises:
identifying sets of the first fetched group of packets clustered according to the transport stream identifier; and
clustering each set according to the modulation and coding format.

47. The device of claim 38, wherein the cluster module is configured to:
fetch, after the first group is fetched, a second group of packets from the scheduled stream of packets for a second cycle period, wherein the fetched second group and packets remaining to be transmitted from the first fetched group are clustered according to the modulation and coding format and the transport stream identifier after the second group is fetched.

48. The device of claim 38, wherein the receiver module comprises a scheduler module configured to:
schedule the prioritized order for the fetching according to a quality of service associated with the scheduled stream of packets.

49. A device for clustering packets for transmission, the device comprising:
means for receiving a scheduled stream of packets for transmission to terminals of a satellite communication system, the scheduled stream of packets prioritized in an order for fetching according to a queuing scheme;
means for identifying a first cycle period corresponding to a predetermined time period for transmission of a group of packets in frames;
means for fetching a first group of packets from the received scheduled stream of packets, the first group fetched according to an estimated number of packets that can be transmitted within the cycle period;

means for associating, after fetching the first group of packets, a modulation and coding format with each of the packets of the first fetched group, each modulation and coding format adapted to the link quality of a destination terminal;

means for clustering the first fetched group of packets of the received scheduled stream of packets according to a modulation and coding format;

means for clustering the first fetched group of packets of the received scheduled stream of packets according to a transport stream identifier;

means for generating a packet list for the first fetched group of packets with clustered packets for each modulation and coding format ordered sequentially from lower order modulation and coding format to higher order modulation and coding format, the packets for each modulation and coding format further clustered in the packet list according to the transport stream identifier; and means for transmitting at least a portion of the first group of packets of the packet list in a plurality of baseband frames in the sequential order, each baseband frame associated with a modulation and coding format.

* * * * *